United States Patent [19]
Fujioka et al.

[11] Patent Number: 6,085,141
[45] Date of Patent: Jul. 4, 2000

[54] ANTI-SKID CONTROL APPARATUS USING A PUMPLESS FLUID PRESSURE CONTROL DEVICE

[75] Inventors: Hideaki Fujioka, Itami; Takato Ohgaki, Ashiya; Kazumi Yasuzumi, Itami, all of Japan

[73] Assignee: Sumitomo Electric Industries, Ltd., Osaka, Japan

[21] Appl. No.: 09/037,931

[22] Filed: Mar. 11, 1998

[30] Foreign Application Priority Data

Mar. 13, 1997 [JP] Japan ..................................... 9-59355

[51] Int. Cl.⁷ ..................................................... B60T 7/12
[52] U.S. Cl. ...................... 701/76; 303/122.09; 303/166; 701/78
[58] Field of Search .................... 701/71, 76, 78; 303/117.1, 119.2, 122.08, 112.09, 125, 166; 91/466

[56] References Cited

U.S. PATENT DOCUMENTS

| | | | |
|---|---|---|---|
| 5,375,506 | 12/1994 | Hashida et al. | 91/446 |
| 5,403,075 | 4/1995 | Fujioka | 303/166 |
| 5,474,371 | 12/1995 | Shinomiya | 303/117.1 |
| 5,480,223 | 1/1996 | Hashida et al. | 303/119.2 |
| 5,545,929 | 8/1996 | Fijioka et al. | 303/166 |
| 5,549,368 | 8/1996 | Yasuzumi | 303/122.08 |
| 5,575,542 | 11/1996 | Tanaka et al. | 303/125 |
| 5,647,647 | 7/1997 | Kato et al. | 303/112.09 |

FOREIGN PATENT DOCUMENTS

| | | |
|---|---|---|
| 63-301155 | 12/1988 | Japan . |
| 6-298060 | 10/1994 | Japan . |

OTHER PUBLICATIONS

Brockman et al., "Experimental and Survey Based Evaluation of a Low–Cost ABS–System (ABS–Compact)," 28th Advanced Transportation Systems, pp. 449–457 (1995).
An English language Abstract of JP 63–301155.
An English Language Abstract of JP 6–298060.

Primary Examiner—William A. Cuchlinski, Jr.
Assistant Examiner—Edward Pipala
Attorney, Agent, or Firm—Greenblum & Bernstein, P.L.C.

[57] ABSTRACT

An anti-skid control apparatus includes a fluid pressure control valve positioned between a master cylinder and a wheel cylinder of each wheel. The fluid pressure control valve controls the wheel pressure cylinder. A reservoir is provided for temporarily storing brake fluid expelled from the wheel cylinder during an anti-skid control. A pumpless fluid pressure control device is also provided for circulating brake fluid stored in the reservoir back to a master cylinder without using a pump. A flow control valve for maintaining a constant flow of brake fluid is positioned between the master cylinder and the wheel cylinder.

8 Claims, 12 Drawing Sheets

ANTI-SKID CONTROL APPARATUS USING A PUMPLESS FLUID PRESSURE CONTROL DEVICE

BACKGROUND OF THE INVENTION

1. Field of the Invention

The present invention relates to an anti-skid control apparatus for a vehicle, and particularly to an anti-skid control apparatus from which a pump, and a motor for driving said pump, used for pumping brake fluid stored in a reservoir to a master cylinder, have been omitted.

2. Description of the Related Art

As progress has been made reducing the cost of anti-skid control apparatuses, a pumpless anti-skid control apparatus has been proposed. Based on a circulating type fluid pressure control device, this pumpless anti-skid control apparatus eliminates the pump used for pumping brake fluid expelled by a wheel cylinder and stored to a reservoir into the discharge chamber of the master cylinder, and eliminates the motor for driving said pump. A problem with this type of pumpless system, however, is that anti-skid control can only be continued until the reservoir becomes filled with brake fluid. To extend for as long as possible the time that anti-skid control can be sustained, it was necessary to reduce the pressure reduction while also extending as long as possible the generation cycle of wheel speed skidding during anti-skid control.

It was therefore proposed in Japanese Patent Laid-Open Publication (unexamined) No. 63-301155 to add a cut-off valve to a pumpless circulating-type anti-skid system, provide a master cylinder back pressure valve between the inlet solenoid and cut-off valve, and minimize repressurization by supplying pressure lower than the master cylinder pressure to avoid wheel locking.

Japanese Patent Laid-Open Publication (unexamined) No. 6-298060 discloses a pumpless system for stopping a vacuum booster and using reduced pressure; when increasing the fluid pressure, this system supplies brake fluid from the master cylinder, but when pressure reducing continues for longer than a specific time, booster operation is stopped, or the booster is driven in the opposite direction, that is, in the direction causing the brake pedal to return, moving the piston of the master cylinder in the pressure reducing direction to lower the master cylinder pressure.

As described above, Japanese Patent Laid-Open Publication (unexamined) No. 63-301155 and Japanese Patent Laid-Open Publication (unexamined) No. 6-298060 propose suppressing the master cylinder pressure during anti-skid control. A pumpless anti-skid system must also enable anti-skid control when the skid cycle is long, however, and this requires that the wheel cylinders be repressurized to achieve a constant repressurization amount irrespective of the pedal pressure applied to the brake pedal by the driver. Generally speaking, when the pedal pressure applied by the driver increases, the master cylinder pressure increases, and the increase in the wheel cylinder pressure achieved for an increase-pressure command time increases proportionally to the master cylinder pressure.

As described above, the amount of repressurization during anti-skid control varies according to the variation in brake pedal pressure applied by the driver, and the master cylinder pressure varies according to the control conditions. As a result, an appropriate increase in pressure is not achieved, and the length of time during which anti-skid control can be sustained becomes shorter. Therefore, to achieve a specific increase in pressure relative to a particular wheel cylinder pressure irrespective of the brake pedal pressure applied by the driver, the pressurization time must be variably set. This cannot be achieved without detecting the master cylinder pressure using some kind of sensor, and this use of sensors increases cost.

Furthermore, when the friction coefficient $\mu$ of the road surface changes suddenly from a high $\mu$ to a low $\mu$, a large volume of brake fluid flows into the reservoir, and the friction coefficient $\mu$ of the road surface then again changes suddenly to a high $\mu$, there is the problem that the tolerance for depressing the brake pedal becomes smaller, and deceleration of the vehicle cannot be recovered.

SUMMARY OF THE INVENTION

With consideration for the above problems, an object of the present invention is therefore to achieve a specific pressure increase relative to a wheel cylinder pressure, and achieve a sufficient vehicle deceleration even after the road surface changes to a high $\mu$ surface, irrespective of the brake pedal pressure applied by the driver and without using a sensor for detecting master cylinder pressure in an anti-skid control apparatus having a pumpless fluid pressure control device.

The present invention is achieved in an anti-skid control apparatus having a fluid pressure control valve for controlling the wheel cylinder pressure, and a reservoir for temporarily storing brake fluid expelled from a wheel cylinder during anti-skid control, between a master cylinder and wheel cylinder of each wheel, and having a pumpless fluid pressure control device for circulating brake fluid stored to a reservoir back to a master cylinder without using a pump. That is, the present invention provides an anti-skid control apparatus comprising in such an anti-skid control apparatus a flow control valve for maintaining a constant flow of brake fluid between the master cylinder and wheel cylinder.

More specifically, the flow control valve is disposed between the master cylinder and fluid pressure control device, or between the fluid pressure control device and a wheel cylinder of each wheel.

In addition, an anti-skid control apparatus according to the present invention further comprises a wheel speed sensor disposed to each wheel for detecting a wheel speed, and a signal processing device for accomplishing anti-skid control by detecting a condition of each wheel from a signal from each wheel speed sensor, and controlling the fluid pressure control device according to the condition of each wheel, wherein the signal processing device comprises a pressure-decreasing prohibition means for calculating an estimated pressure for each wheel cylinder based on a wheel cylinder pressure control command set according to respective signals from each wheel speed sensor, and prohibiting pressure-decreasing control of the wheel cylinder pressure by the fluid pressure control device when a total fluid amount accumulated in a reservoir calculated from a calculated estimated pressure exceeds a prescribed value.

That is, specifically, the signal processing device comprises a speed calculation means for calculating a wheel speed of each wheel and an estimated vehicle speed from respective signals of each wheel speed sensor; a wheel condition detection means for detecting a condition of each wheel from a wheel speed and estimated vehicle speed calculated by the speed calculation means; a fluid pressure control command means for instructing wheel cylinder pressure control of a corresponding wheel according to the condition of each wheel detected by a wheel condition detection means; an estimated fluid pressure calculation means for calculating an estimated fluid pressure in a wheel cylinder of each wheel from a command set by the fluid pressure control command means; a control means for controlling said fluid pressure control device based on a command from the fluid pressure control command means; and a reservoir fluid level calculation means for calculating the total amount of fluid accumulated in the reservoir from the estimated fluid pressure calculated by the estimated fluid pressure calculation mean; wherein the pressure-decreasing prohibition means prohibits pressure-decreasing control of the wheel cylinder pressure by the control means when the total fluid amount calculated by the reservoir fluid level calculation means exceeds a prescribed level.

BRIEF DESCRIPTION OF THE DRAWINGS

These and other objects and features of the present invention will become clear from the following description taken in conjunction with the preferred embodiment thereof and the accompanying drawings throughout which like parts are designated by like reference numerals, and in which.

DETAILED DESCRIPTION OF THE PREFERRED EMBODIMENT

The present invention is described in detail below based on the embodiments of the invention shown in the accompanying figures.

Embodiment 1

Figure 1:
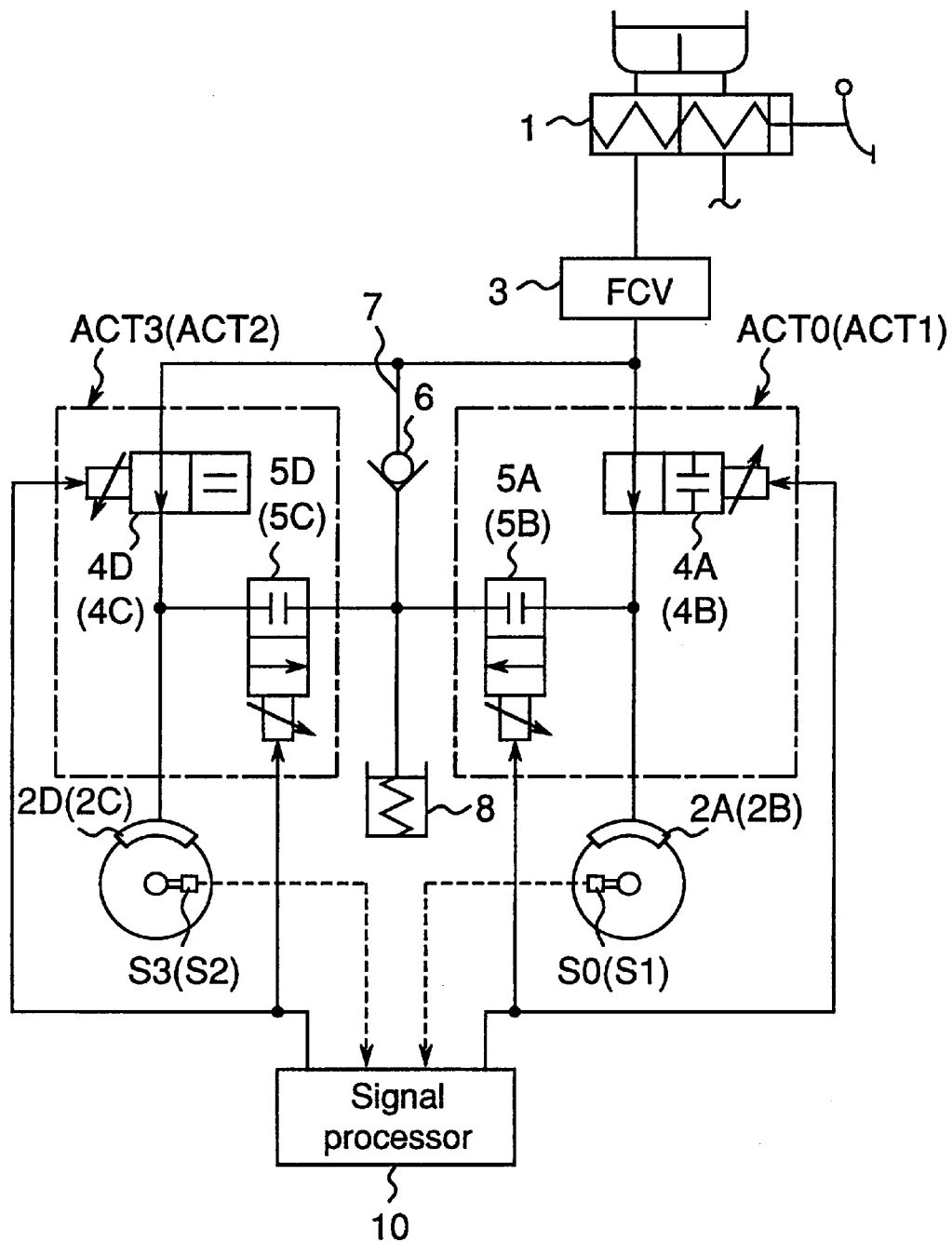
FIG. 1 is a simplified control system diagram showing an example of an anti-skid control apparatus according to a first embodiment of the present invention.

FIG. 1 is a simplified control system diagram exemplary of an anti-skid control apparatus according to a first embodiment of the present invention, using by way of example a two-circuit diagonal split wheel brake system. It should be noted that the system shown in FIG. 1 comprises only one of the two brake system circuits, specifically the one circuit comprising the right front (FR) and left rear (RL) wheels.

As shown in FIG. 1, a flow control valve 3 is disposed between the master cylinder 1 and the opposing right and left front wheel and right and left rear wheel wheel cylinders 2A, 2B, 2C, 2D. Inlet valves 4A, 4B, 4C, and 4D, which are on/off solenoid valves, are also disposed between the flow control valve 3 and wheel cylinders 2A to 2D. A circulation line 7 returning from the wheel cylinders 2A to 2D to the master cylinder 1 by way of the outlet valves 5A, 5B, 5C and 5D, which are on/off solenoid valves, and check valve 6 is also provided. A reservoir 8 is disposed on the circulation line 7 between outlet valves 5A to 5D and the check valve 6. It should be noted that the indices A, B, C, and D on the wheel cylinder inlet valves and outlet valves indicate the right and left front wheels and right and left rear wheels, respectively.

Wheel speed sensors S0, S1, S2, and S3 are connected to a signal processor 10. Wheel speed sensors S0, S1, S2, and S3 detect the speed of the right and left front wheels and right and left rear wheels, respectively, and send the detected speed to the signal processor 10 as a wheel speed signal.

Figure 2:
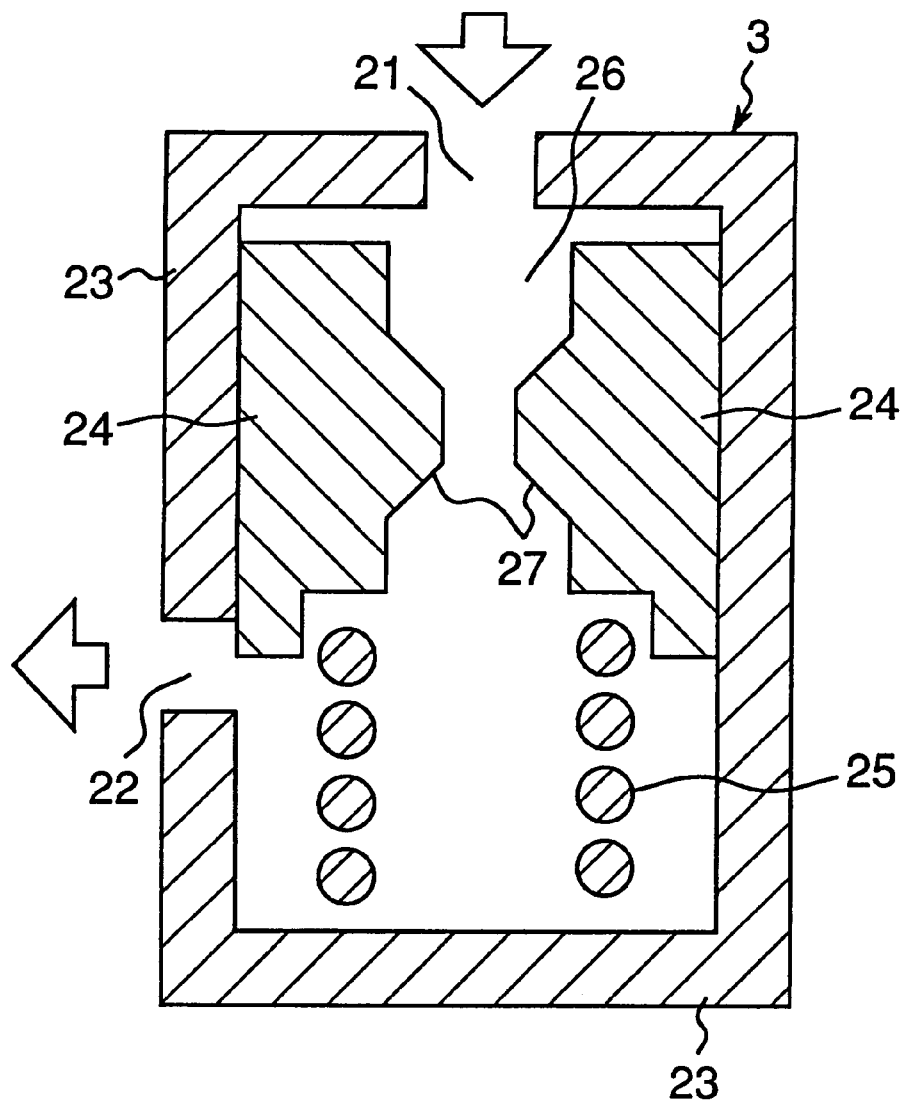
FIG. 2 is a cross sectional view of an exemplary construction of the flow control valve 3 shown in FIG. 1.

An example of the operation of the flow control valve 3 is described next. The flow control valve 3 is known in the literature, and can be constructed in various ways. FIG. 2 is a cross sectional view of the structure of the flow control valve 3. The operation of the flow control valve 3 is described briefly below using FIG. 2. As shown in FIG. 2, the flow control valve 3 comprises a hollow, cylindrical casing 23 having an inlet 21 to which brake fluid flows and an outlet 22 from which the in-flowing brake fluid is expelled; a sliding member 24 that slides inside the casing 23; and a coil spring 25. The inlet 21 is provided in the top of the casing 23, the outlet 22 is provided in the side of the casing 23, a through-hole 26 through which the brake fluid flowing in from the inlet 21 passes is formed in the sliding member 24, and an orifice 27 is formed at substantially the center of the through-hole 26. The brake fluid flowing in from the inlet 21 passes the through-hole 26 in the sliding member 24, and is expelled to the outside from the outlet 22.

When the brake fluid passes the through-hole 26 in the sliding member 24, the flow rate is limited by the orifice 27, and the sliding member 24 is thus pushed down. The depressed sliding member 24 closes the outlet 22, the inflow of brake fluid from the inlet 21 stops, the pressure pushing down on the sliding member 24 is diminished, and the sliding member 24 is then pushed back up by the coil spring 25. Occlusion of the outlet 22 is released by pushing the sliding member 24 up, allowing brake fluid to flow out again from the outlet 22, and resulting in the sliding member 24 being pushed down again. By repeating this operation, the flow control valve 3 can maintain the flow of brake fluid from the outlet 22 at a constant level.

Figure 3:
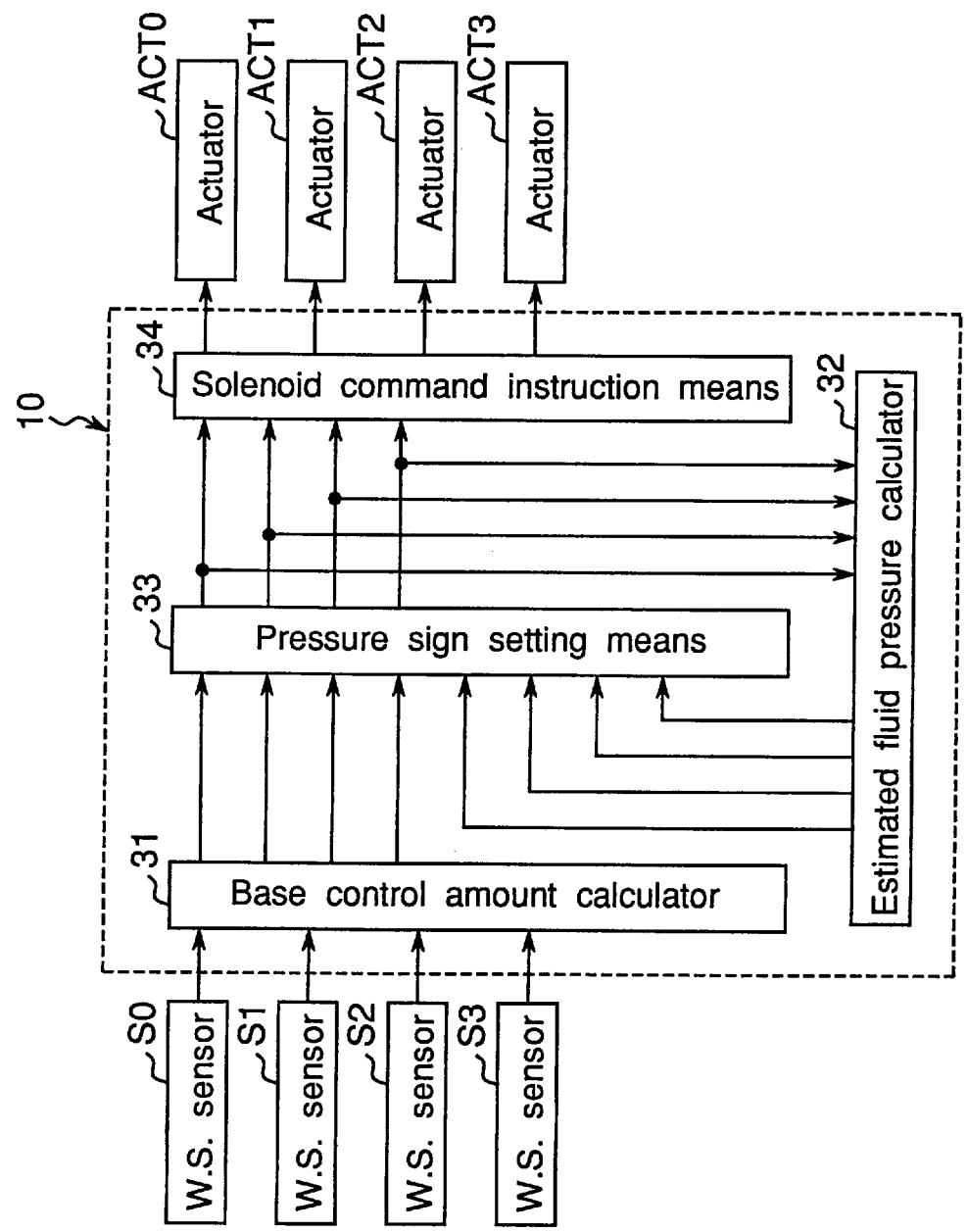
FIG. 3 is a simplified block diagram showing an example of an anti-skid control apparatus according to a first embodiment of the present invention.

Next, FIG. 3 is a simplified block diagram of an anti-skid control apparatus according to the first embodiment of the present invention. Comprising as shown in FIG. 3 a base control amount calculator 31, an estimated fluid pressure calculator 32, an increase/decrease pressure signal setting means 33, and a solenoid command output means 34, the signal processor 10 applies a specific process to a wheel speed signal to output an increase/decrease pressure signal Si to an actuator ACT0, ACT1, ACT2, or ACT3, each comprising an inlet valve 4A to 4D and outlet valve 5A to 5D. It should be noted that the index i is a value of 0, 1, 2, or 3, and together with indices 0, 1, 2, and 3 of a symbol indicative of a wheel speed sensor or actuator indicates the right and left front wheels and right and left rear wheels of a vehicle.

Referring to FIG. 3, the wheel speed sensors S0 to S3 are each connected to the base control amount calculator 31, and the base control amount calculator 31 is connected to the increase/decrease pressure signal setting means 33. In addition, the increase/decrease pressure signal setting means 33 is connected to the solenoid command output means 34, the estimated fluid pressure calculator 32 is connected to the junction between the increase/decrease pressure signal setting means 33 and solenoid command output means 34, and the estimated fluid pressure calculator 32 is connected to the increase/decrease pressure signal setting means 33. The solenoid command output means 34 is connected to each of the actuators ACT0 to ACT3.

The base control amount calculator 31 calculates the wheel speed SPEEDi, which is indicative of wheel and vehicle behavior, for each wheel based on the wheel speed signals input from the wheel speed sensors S0 to S3. The method for calculating the wheel speed SPEEDi is known in the literature. As an example of one such method, the wheel speed SPEEDi can be calculated from equation (1) below based on the count mi of a pulse signal from a wheel speed sensor generated within a specific period $\Delta t$.

$$\text{SPEED}i = mi/\Delta t \times a \quad (1)$$

where a is a proportional constant.

In addition, the base control amount calculator 31 calculates the estimated vehicle speed Vref from the wheel speed SPEEDi calculated for each wheel. The method of calculating the estimated vehicle speed Vref is also known in the literature. As an example of one such method, the estimated vehicle speed Vref is calculated using the result of low-pass filtering the maximum wheel speed Vmax, that is, the highest of each of the wheel speeds, and can be calculated from equation (2) below.

$$(V\text{ref})_n = (V\text{ref})_{n-1} + K \times \{V\text{max} - (V\text{ref})_{n-1}\} \quad (2)$$

where K is a filter time constant (K<1), $(V\text{ref})_n$ is the value of Vref in the current control cycle, and $(V\text{ref})_{n-1}$ is the value of Vref in the previous control cycle. It should be noted that in addition to the above method, the estimated vehicle speed Vref can be calculated using the result of low-pass filtering the second fastest wheel speed.

Next, the base control amount calculator 31 detects signs of wheel locking from the calculated wheel speed SPEEDi and estimated vehicle speed Vref. For example, the base control amount calculator 31 detects a sign of locking when Vref−SPEEDi≧(2+Vref/16) km/h and d(SPEEDi)/dt≦−1.5 g (where g is the acceleration of gravity), or Vref−SPEEDi≧0.9×Vref (=MIN.10).

If it is the pressure reducing edge at which reducing the wheel cylinder pressure begins, the base control amount calculator 31 instructs the increase/decrease pressure signal setting means 33 to set the total pressure reduction $(\Delta Pti)_n$ of the wheel cylinder pressure from the pressure reducing edge of the current control cycle to 0, and to set the estimated pressure PLi at the decrease-pressure edge to the estimated pressure $(\text{Pesti})_{n-1}$ calculated during the previous control cycle. When signs of locking are detected, the base control amount calculator 31 also outputs a control request REQi instructing a wheel cylinder pressure reduction to the increase/decrease pressure signal setting means 33.

Furthermore, when, for example, Vref−SPEEDi≧(2+Vref/16) km/h and d(SPEEDi)/dt≦−1.5 g is not true, and Vref−SPEEDi≧0.9×Vref (=MIN.10) is also not true, base control amount calculator 31 determines there are no signs of locking. In addition, if Vref−SPEEDi≦2 km/h, the base control amount calculator 31 measures the elapsed apply-pressure time $\Delta Tai$, which is the amount of time elapsed since the transition from reducing or maintaining the wheel cylinder pressure to increasing the pressure, using timer TIMERai (not shown in the figures), and sends a control request REQi instructing an increase in wheel cylinder pressure to the increase/decrease pressure signal setting means 33.

Furthermore, if Vref−SPEEDi≦2 km/h is not true, the base control amount calculator 31 sends a control request REQi instructing that wheel cylinder pressure be maintained to the increase/decrease pressure signal setting means 33.

Next, the estimated fluid pressure calculator 32 calculates the estimated pressure Pesti during anti-skid control using a known method. A method of calculating the estimated pressure Pesti is disclosed, for example, in Japanese Patent Laid-Open Publication (unexamined) No. 5-246317, and is here described using a method for calculating the estimated pressure Pesti from the increase/decrease pressure time of the wheel cylinder pressure.

As shown in FIG. 1, in an anti-skid control apparatus comprising a flow control valve 3 for maintaining a constant flow of brake fluid from the master cylinder 1 to the wheel cylinders 2A to 2D in the fluid path between the master cylinder 1 and the actuators ACT0 to ACT3, which operate as fluid pressure control valves, the increase pressure rate varies with control of the other wheel channel in the same circuit of a two-circuit diagonal split brake system. That is, the estimated fluid pressure calculator 32 calculates the pressure increase $\Delta Pai$ of the wheel cylinder fluid pressure resulting with pressure-increasing time $(Tapply)_{n-1}$ during the previous control cycle from equation (3) below.

$$\Delta Pai = k \times (Tapply)_{n-1} \quad (3)$$

where k is a constant indicative of the increase pressure rate of the wheel cylinder pressure, and varies according to whether the wheel cylinder pressure of the other wheel channel in the same circuit is being maintained or reduced. Note also that $(Tapply)_{n-1}$ is the pressure-increasing time during the previous control cycle. Note, further, that the unit of constant k is bar/sec, and the unit of pressure-increasing time $(Tapply)_{n-1}$ is seconds.

Constant k is determined according to the characteristics of flow control valve 3 whereby a constant flow is maintained as shown in FIG. 1, and the flow rigidity of the wheel cylinders 2A to 2D. When the pressure is increased for, for example, only the front wheel, for the right front wheel for example, in the same brake circuit, the estimated fluid pressure calculator 32 sets the constant k for calculating the pressure increase $\Delta Pa0$ of the right front wheel to k=5× $(Pest0)_{n-1}$+400 when the estimated fluid pressure $(Pest0)_{n-1}$ of the right front wheel calculated during the previous control cycle is ≦40 bar, and to k=600 when $(Pest0)_{n-1}$>40 bar. In addition, when the fluid pressure is increased for both the front wheel and the rear wheel of the same brake circuit, for example, when the pressure is increased for the right front wheel and for the left rear wheel in the same brake circuit, the constant k for calculating the pressure increase $\Delta Pa0$ of the right front wheel is set to k=(7.5×$(Pest0)_{n-1}$+200) when $(Pest0)_{n-1}$≦40 bar, and is set to k=500 when $(Pest0)_{n-1}$>40 bar.

Likewise, when the pressure is increased for, for example, only the rear wheel, for the left rear wheel for example, in the same brake circuit, the estimated fluid pressure calculator 32 sets the constant k for calculating the pressure increase ΔPa3 of the left rear wheel to k=5×(Pest3)$_{n-1}$+600 when the estimated fluid pressure (Pest3)$_{n-1}$ of the left rear wheel calculated during the previous control cycle is ≦40 bar, and to k=800 when (Pest3)$_{n-1}$>40 bar.

In addition, when the fluid pressure is increased for both the rear wheel and the front wheel of the same brake circuit, for example, when the pressure is increased for the left rear wheel and for the right front wheel in the same brake circuit, the constant k for calculating the pressure increase ΔPa3 of the left rear wheel is set to k=(7.5×(Pest3)$_{n-1}$+300) when (Pest3)$_{n-1}$≦40 bar, and is set to k=600 when (Pest3)$_{n-1}$>40 bar.

It should be noted that the increase pressure rate of each wheel can be obtained in the same manner for the left front wheel and right rear wheel. In addition, the above values of constant k are by way of example only, and the value of constant k is set variably according to the brake characteristics.

The decrease pressure rate, on the other hand, does not change according to the control of the other wheel channel in the same circuit, and the estimated fluid pressure calculator 32 calculates the pressure decrease ΔPdi of the wheel cylinder pressure reduced during the previous control cycle by decrease-pressure time (Tdumpi)$_{n-1}$ from equation (4) below.

$$\Delta Pdi = L \times (Pesti)_{n-1} \times (Tdumpi)_{n-1} \quad (4)$$

where L is a constant that changes according to the wheel cylinder pressure, and (Pesti)$_{n-1}$ is the estimated pressure of the wheel cylinder during the previous control cycle. (Tdumpi)$_{n-1}$ is the decrease pressure time during the previous control cycle. It should be noted that the unit of L is 1/sec, and the unit of (Tdumpi)$_{n-1}$ is seconds.

When calculating the pressure decrease of the front wheel, the estimated fluid pressure calculator 32 sets L to −6.3 when the estimated fluid pressure of the front wheel is 40 bar or less, and sets L to −12.5 when the estimated fluid pressure of the front wheel exceeds 40 bar. Likewise, when calculating the rear wheel pressure decrease, the estimated fluid pressure calculator 32 sets L to −6.3 when the estimated fluid pressure of the rear wheel is 40 bar or less, and sets L to −12.5 when the estimated fluid pressure of the rear wheel exceeds 40 bar. In addition, the above values of constant L are by way of example only, and the value of constant L is set variably according to the brake characteristics.

The estimated fluid pressure calculator 32 also calculates the total pressure decrease (ΔPti)$_n$ in the current control cycle by adding the above-calculated pressure decrease ΔPdi to the total pressure decrease (ΔPti)$_{n-1}$ of the wheel cylinder pressure from the decrease pressure edge in the previous control cycle.

When the increase/decrease pressure signal Si output from the increase/decrease pressure signal setting means 33 to the solenoid command output means 34 was set for increasing the wheel cylinder pressure during the previous control cycle, the estimated fluid pressure calculator 32 calculates the pressure increase ΔPai during the previous control cycle from equation (3) above. The estimated fluid pressure calculator 32 also calculates the estimated pressure (Pesti)$_n$ in the current control cycle by adding the calculated pressure increase ΔPai to the estimated pressure (Pesti)$_{n-1}$ calculated in the previous control cycle, and sends the estimated pressure (Pesti)$_n$ to the increase/decrease pressure signal setting means 33.

In addition, when the increase/decrease pressure signal Si output from the increase/decrease pressure signal setting means 33 to the solenoid command output means 34 was set for decreasing the wheel cylinder pressure during the previous control cycle, the estimated fluid pressure calculator 32 calculates the pressure decrease ΔPdi during the previous control cycle from equation (4) above, and calculates the total pressure decrease (ΔPti)$_n$ as described above. The estimated fluid pressure calculator 32 also calculates the estimated pressure (Pesti)$_n$ in the current control cycle by adding the calculated pressure decrease ΔPdi to the estimated pressure (Pesti)$_{n-1}$ calculated in the previous control cycle, and sends the estimated pressure (Pesti)$_n$ to the increase/decrease pressure signal setting means 33.

Furthermore, when the increase/decrease pressure signal Si output from the increase/decrease pressure signal setting means 33 to the solenoid command output means 34 was set for maintaining the wheel cylinder pressure during the previous control cycle, the estimated fluid pressure calculator 32 sends the estimated pressure (Pesti)$_{n-1}$ calculated in the previous control cycle to the increase/decrease pressure signal setting means 33 as the estimated pressure (Pesti)$_n$ of the current control cycle.

Next, using a known method according to the control request REQi from the base control amount calculator 31, the increase/decrease pressure signal setting means 33 sets the increase/decrease pressure signal Si, which comprises the decrease-pressure time Tdumpi, the pressure-increasing time Tapplyi, and the pressure-hold time Tholdi, where pressure-decreasing time Tdumpi is the time for closing inlet valves 4A to 4D and opening outlet valves 5A to 5D of the actuators ACT0 to ACT3, pressure-increasing time Tapplyi is the time for opening inlet valves 4A to 4D and closing outlet valves 5A to 5D of the actuators ACT0 to ACT3, and pressure-hold time Tholdi is the time for closing both inlet valves 4A to 4D and outlet valves 5A to 5D of the actuators ACT0 to ACT3.

An example of the increase/decrease pressure signal setting means 33 setting the increase/decrease pressure signal Si is described next below. Using the table shown as Table 1 below, the increase/decrease pressure signal setting means 33 sets the pressure-decreasing time Tdumpi, pressure-increasing time Tapplyi, and pressure-hold time Tholdi of the increase/decrease pressure signal Si according to the control request REQi from the base control amount calculator 31.

TABLE 1

| TBLNO | Decreaes pressure time (ms) | Hold pressure time (ms) | Increase pressure time (ms) |
|---|---|---|---|
| 7 | 0 | 0 | ∞ |
| 6 | ↑ | 8 | 8 |
| 5 | ↑ | 16 | 4 |
| 4 | ↑ | 32 | ↑ |
| 3 | ↑ | 64 | ↑ |
| 2 | ↑ | 128 | ↑ |
| 1 | ↑ | 256 | ↑ |
| 0 | ↑ | ∞ | 0 |
| −1 | 8 | 32 | ↑ |
| −2 | ↑ | 24 | ↑ |
| −3 | ↑ | 16 | ↑ |
| −4 | ↑ | 8 | ↑ |
| −5 | 16 | ↑ | ↑ |
| −6 | 24 | ↑ | ↑ |
| −7 | ∞ | 0 | ↑ |

When the control request REQi from the base control amount calculator 31 is "hold pressure," the increase/decrease pressure signal setting means 33 selects TBLNO 0 in Table 1 above to set the pressure-hold time Tholdi, and sends the increase/decrease pressure signal Si in which pressure-hold time Tholdi is thus set to the estimated fluid pressure calculator 32 and solenoid command output means 34.

When the control request REQi from the base control amount calculator 31 is "decrease pressure," the increase/decrease pressure signal setting means 33 selects the TBLNO in the above Table 1 according to the acceleration/deceleration speed d(SPEEDi)/dt of each wheel to the pressure-decreasing time Tdumpi and pressure-hold time Tholdi. For example, when d(SPEEDi)/dt≦−6 g, TBLNO −7 is selected; when d(SPEEDi)/dt≦−4 g, TBLNO −6 is selected; when d(SPEEDi)/dt≦−3 g, TBLNO −5 is selected; and when d(SPEEDi)/dt>−3 g, TBLNO −4 is selected.

In addition, pressure-decreasing time Tdumpi is corrected to become longer using, for example, equation (5) below when the friction coefficient $\mu$ of the road surface being braked on is low, that is, when the braking deceleration level MUE is a low g.

$$TBLNOa = TBLNO - (3 - MUE) \qquad (5)$$

where TBLNOa is the compensation value of the TBLNO, of which the lowest value is −7, and 1 MUE is 0.125 g.

In this way, the increase/decrease pressure signal setting means 33 sends a increase/decrease pressure signal Si, in which both the pressure-decreasing time Tdumpi and pressure-hold time Tholdi are set, to the estimated fluid pressure calculator 32 and solenoid command output means 34.

Next, when the control request REQi from the base control amount calculator 31 is "increase pressure," the increase/decrease pressure signal setting means 33 selects a TBLNO in the above Table 1 according to the estimated pressure $(Pesti)_n$ of the current control cycle and the total pressure decrease $(\Delta Pti)_n$ calculated by the estimated fluid pressure calculator 32, and the friction coefficient $\mu$ of the road surface and estimated pressure PLi at the decrease-pressure edge, to set the pressure-increasing time Tapplyi and pressure-hold time Tholdi in the increase/decrease pressure signal Si.

When $(Pesti)_n \leq PLi + (\Delta Pti)_n \times 0.4$, the increase/decrease pressure signal setting means 33 sets the pressure-increasing time Tapplyi to achieve a rapid increase in pressure. For example, the increase/decrease pressure signal setting means 33 selects a TBLNO in the above Table 1 from the road surface friction coefficient $\mu$, selects TBLNO 7 in the above Table 1 when the road surface has a high friction coefficient $\mu$ ($\mu \geq 5$), selects TBLNO 6 in the above Table 1 when the road surface has a median friction coefficient $\mu$ ($\mu \geq 3$), and selects TBLNO 5 in the above Table 1 when the road surface has a low friction coefficient $\mu$ ($\mu < 3$).

In this way, the increase/decrease pressure signal setting means 33 sends an increase/decrease pressure signal Si, in which both the pressure-increasing time Tapplyi and pressure-hold time Tholdi are set from the selected TBLNO based on Table 1, to the estimated fluid pressure calculator 32 and solenoid command output means 34.

Furthermore, when $(Pesti)_n > PLi + (\Delta Pti)_n \times 0.4$, the increase/decrease pressure signal setting means 33 sets the pressure-increasing time Tapplyi to achieve a gradual increase in pressure. For example, the increase/decrease pressure signal setting means 33 selects a TBLNO in the above Table 1 based the road surface friction coefficient $\mu$ and the elapsed apply-pressure time $\Delta Tai$ as shown in the below Table 2, and sends an increase/decrease pressure signal Si, in which both the pressure-increasing time Tapplyi and pressure-hold time Tholdi are set, to the estimated fluid pressure calculator 32 and solenoid command output means 34.

TABLE 2

| TBLNO | elapsed apply-pressure time $\Delta Tai$ | road surface $\mu$ |
|---|---|---|
| 2 | $\Delta Tai \leq 0.3$ sec | high $\mu$ ($\geq 5$) |
| 1 |  | median $\mu$ ($\geq 3$) |
| 1 |  | low $\mu$ ($<3$) |
| 3 | $\Delta Tai \leq 0.6$ sec | high $\mu$ |
| 3 |  | median $\mu$ |
| 2 |  | low $\mu$ |
| 4 | $\Delta Tai \leq 0.9$ sec | high $\mu$ |
| 3 |  | median $\mu$ |
| 3 |  | low $\mu$ |
| 7 | $\Delta Tai > 0.9$ sec | — |

Based on the increase/decrease pressure signal Si input from the increase/decrease pressure signal setting means 33, the solenoid command output means 34 controls the operation of the inlet valves 4A to 4D and outlet valves 5A to 5D of the actuators ACT0 to ACT3.

Figure 4:
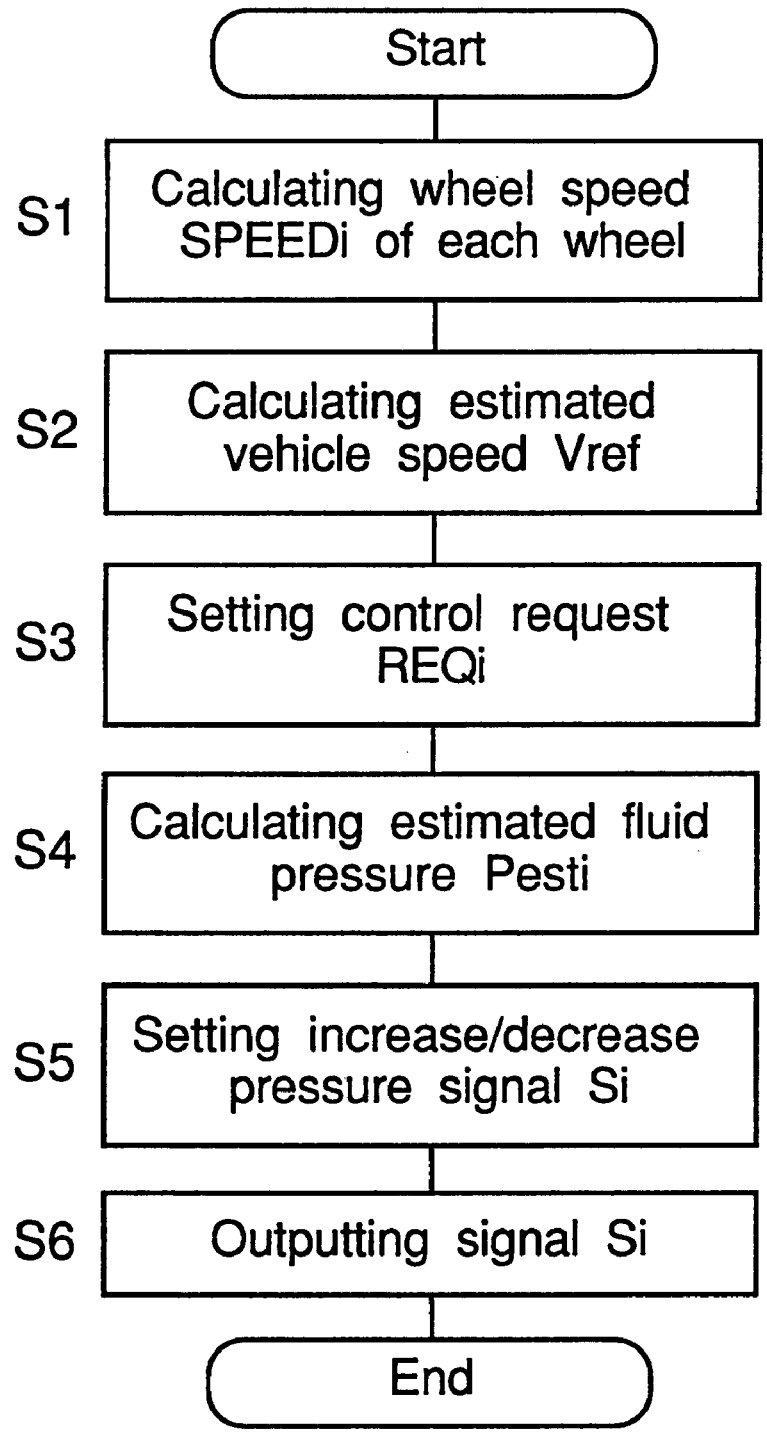
FIG. 4 is a simplified flow chart used to describe an example of the operation of the anti-skid control apparatus shown in FIG. 3.

The operation of an anti-skid control apparatus shown in FIG. 3 is described next with reference to FIG. 4 to FIG. 7. FIG. 4 is a simplified flow chart of an example of the operation of the anti-skid control apparatus shown in FIG. 3.

Referring to FIG. 4, the base control amount calculator 31 first calculates, in step S1, the wheel speed SPEEDi of each wheel based on the wheel speed signals input from the wheel speed sensors S0 to S3, and in step S2 calculates the estimated vehicle speed Vref from the calculated wheel speed SPEEDi of each wheel.

Next, in step S3, the base control amount calculator 31 detects signs of wheel locking and recovery from locking from the calculated wheel speed SPEEDi of each wheel and the estimated vehicle speed Vref, sets the control request REQi, which is a wheel cylinder pressure control command for each wheel, and outputs to the control request REQi to the increase/decrease pressure signal setting means 33.

An example of the process whereby the base control amount calculator 31 sets the control request REQi in step S3 is described next below with reference to the flow chart in FIG. 5. Note that unless otherwise specified, all steps in the process in FIG. 5 are performed by the base control amount calculator 31.

Figure 5:
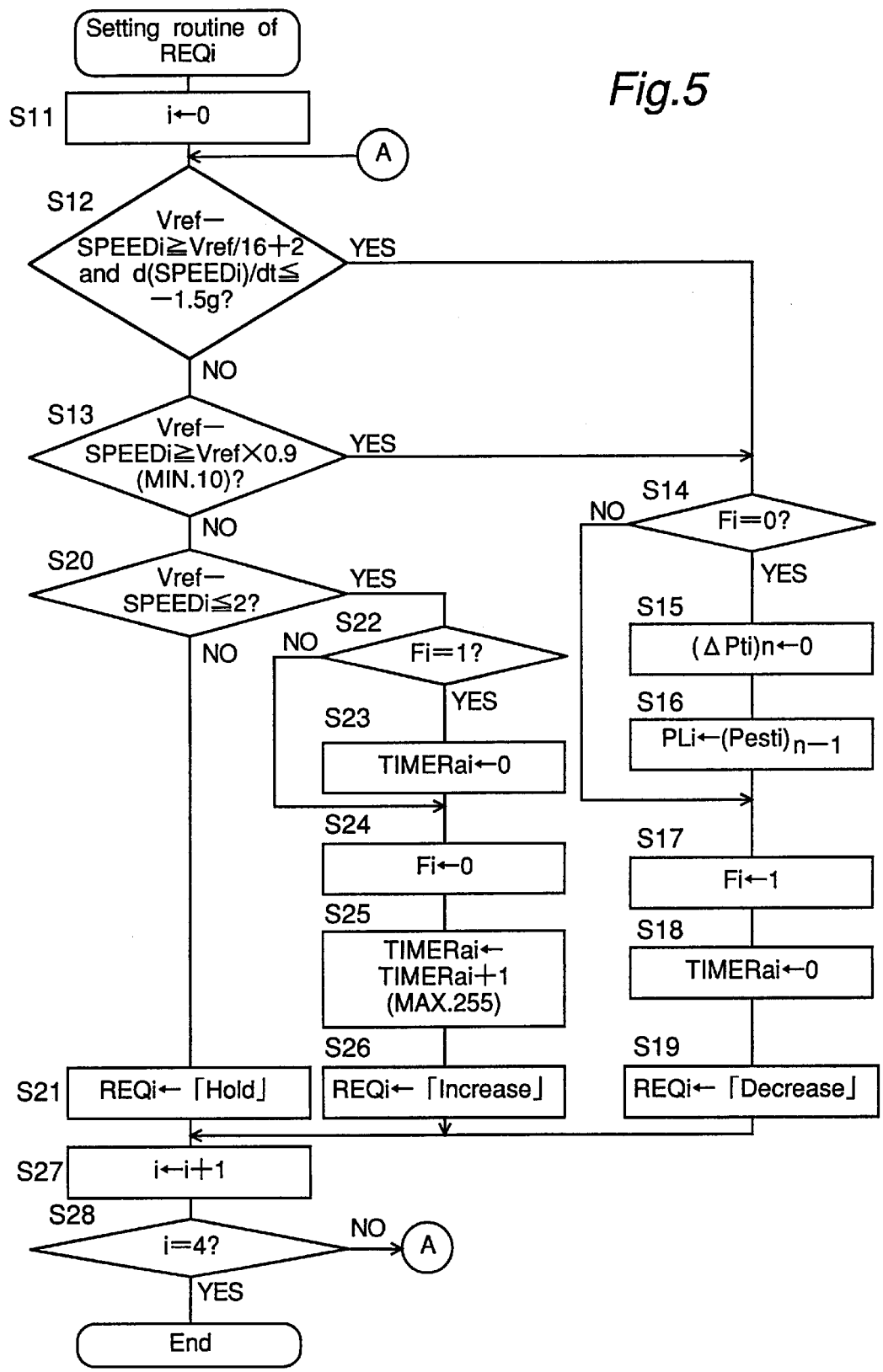
FIG. 5 is a flow chart used to describe an example of the process whereby the base control amount calculator 31 in FIG. 3 sets a control request REQi.

Referring to FIG. 5, the index set for each wheel is first counted in step S11, the index counter i used for determining whether the process has been completed for all four wheels is set to 0, and the flow advances to step S12.

In step S12, the wheel speed sensor for the wheel corresponding to the value set to the index counter i, for example, if a counter of 0 indicates the right front wheel, it is determined whether Vref−SPEED0≧(2+Vref/16) km/h and d(SPEED0)/dt≦−1.5 g, based on the estimated vehicle speed Vref and the wheel speed SPEED0 calculated from the signal from the wheel speed sensor S0 of the right front wheel. If Vref−SPEED0 is not greater than or equal to (2+Vref/16) km/h and d(SPEED0)/dt is not less than or equal to −1.5 g (NO), flow advances to step S13.

In step S13 it is determined whether Vref−SPEED0≧Vref×0.9 (MIN.10). If Vref−SPEED0≧Vref×0.9 (YES), flow advances to step S14; if not Vref−SPEED0≧Vref×0.9 (NO), flow advances to step S20. Furthermore, if in step S12 Vref−SPEED0≧(2+Vref/16) km/h and d(SPEED0)/dt≦−1.5 g and step S12 returns YES, flow advances to step S14.

In step S14, it is determined whether flag F0, which indicates that the control request REQ0 is to decrease pressure, is reset. If F0 is reset (YES), the increase/decrease pressure signal setting means 33 is instructed in step S15 to set the total pressure decrease $(\Delta Pt0)_n$ in the current control cycle to 0, and the increase/decrease pressure signal setting means 33 sets the total pressure decrease $(\Delta Pt0)_n$ to 0 as instructed.

Next, in step S16, the increase/decrease pressure signal setting means 33 is instructed to set the estimated pressure PL0 at the decrease-pressure edge to the estimated pressure $(Pest0)_{n-1}$ calculated during the previous control cycle. After the increase/decrease pressure signal setting means 33 sets the estimated pressure PL0 at the decrease-pressure edge to the estimated pressure $(Pest0)_{n-1}$ calculated during the previous control cycle as instructed, flow advances to step S17.

In addition, if F0 is set in step S14 (NO), flow advances to step S17.

In step S17, the flag F0 indicating that the control request REQ0 is to decrease pressure is set, and in step S18 the timer TIMERa0 for measuring the elapsed apply-pressure time $\Delta Ta0$ is reset to 0. In addition, in step S19, a control request REQ0 instructing a decrease in pressure in the wheel cylinder pressure of the right front wheel is set and output to the increase/decrease pressure signal setting means 33, and flow advances to step S27.

In step S20 it is determined whether Vref−SPEED0≦2 km/h. If Vref−SPEED0≦2 km/h is not true (NO), flow advances to step S21. In step S21, a control request REQ0 instructing the wheel cylinder pressure of the right front wheel be held is set and sent to the increase/decrease pressure signal setting means 33, and flow advances to step S27.

If Vref−SPEED0≦2 km/h (YES) in step S20, flow advances to step S22. In step S22, it is determined whether flag F0 is set, that is, it is determined whether there was a decrease pressure condition reducing the wheel cylinder pressure of the right front wheel during the previous control cycle; if flag F0 is set (YES), that is, there was a decrease pressure condition reducing the wheel cylinder pressure of the right front wheel during the previous control cycle, the timer TIMERa0 is reset to 0 in step S23, and flow advances to step S24. In addition, if flag F0 is not set (NO) in step S22, flow advances to step S24.

After resetting flag F0 in step S24, the timer TIMERa0 is incremented in step S25. Next, in step S26, a control request REQ0 instructing the wheel cylinder pressure of the right front wheel be increased is set and sent to the increase/decrease pressure signal setting means 33, and flow advances to step S27. In step S27, the index counter i is incremented. In step S28, it is determined whether the value of the index counter i is 4. If the value of the index counter i is not 4 (NO), flow returns to step S12, and the process from step S12 to step S26 is repeated for the wheel corresponding to an index counter i value of 1.

If in step S28 the value of the index counter i is 4 (YES), the process from step S12 to step S26 has been completed for all four wheels, the routine shown in FIG. 5 terminates, and flow advances to step S4 in FIG. 4.

Returning to step S4 in FIG. 4, the estimated fluid pressure calculator 32 calculates the pressure decrease $\Delta Pdi$ or the pressure increase $\Delta Pai$ during the previous control cycle according to the increase/decrease pressure signal Si input from the increase/decrease pressure signal setting means 33 in the previous control cycle, adds the calculated pressure decrease $\Delta Pdi$ or pressure increase $\Delta Pai$ to the estimated pressure $(Pesti)_{n-1}$ calculated during the previous control cycle, and calculates the estimated pressure $(Pesti)_n$ during the current control cycle. In addition, when the increase/decrease pressure signal Si during the previous control cycle was a "decrease pressure" signal, the estimated fluid pressure calculator 32 calculates the total pressure decrease $(\Delta Pti)_n$ in the current control cycle. It should be noted that when the increase/decrease pressure signal Si during the previous control cycle was set to "hold" the wheel cylinder pressure, the estimated pressure $(Pesti)_{n-1}$ calculated during the previous control cycle is used as the estimated pressure $(Pesti)_n$ during the current control cycle.

An example of the process whereby the estimated fluid pressure calculator 32 calculates the estimated pressure Pesti in step S4 is described next below with reference to the flow chart in FIG. 6. It should be noted that unless otherwise stated, all steps in the process shown in FIG. 6 are performed by the estimated fluid pressure calculator 32.

Figure 6:
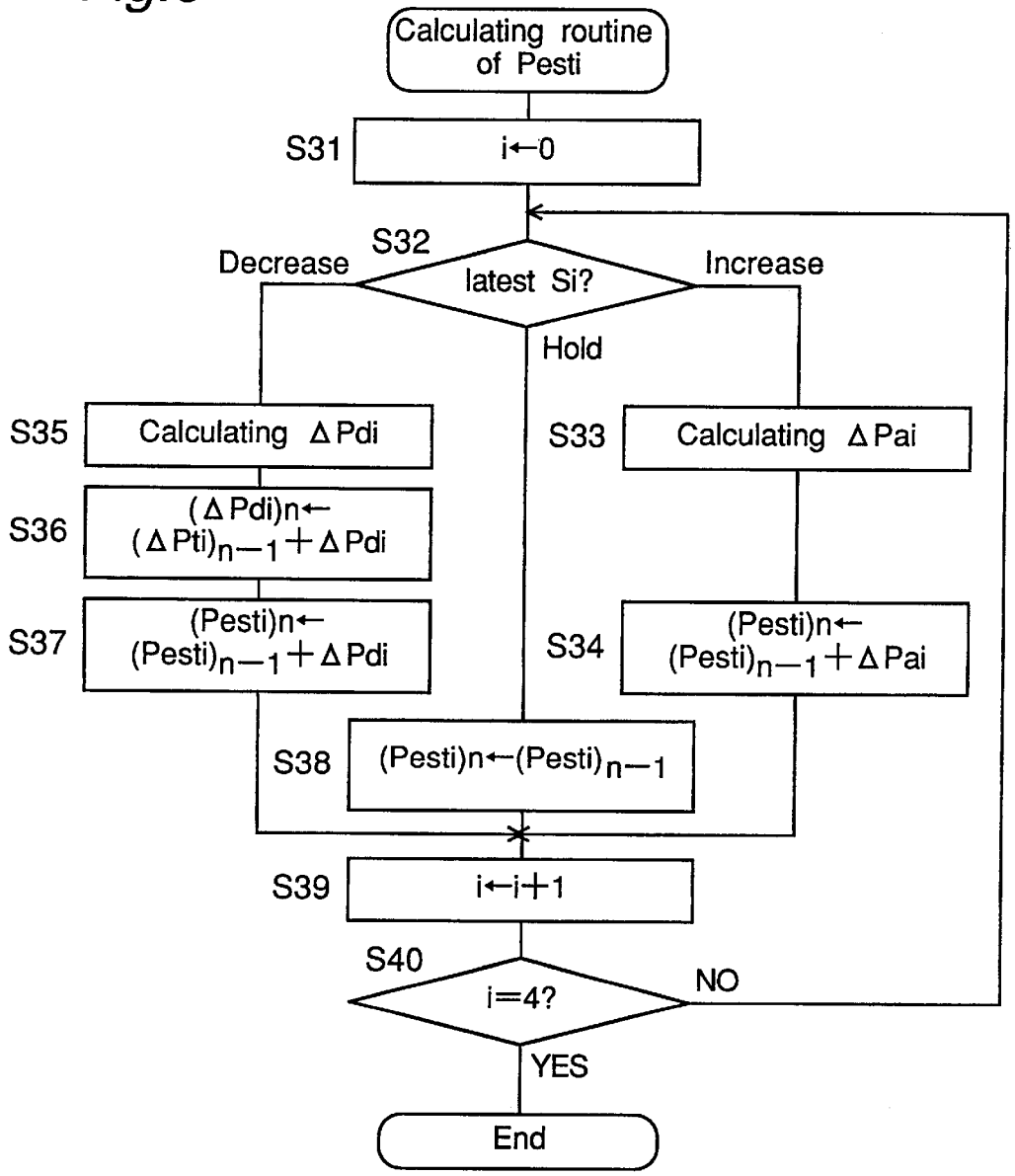
FIG. 6 is a flow chart used to describe an example of the process whereby the estimated fluid pressure calculator 32 in FIG. 3 calculates the estimated pressure Pesti.

Referring to FIG. 6, the index set for each wheel is first counted in step S31, the index counter i used for determining whether the process has been completed for all four wheels is set to 0, and the flow advances to step S32.

In step S32, the increase/decrease pressure signal Si input from the increase/decrease pressure signal setting means 33 during the previous control cycle for the tire corresponding to the counter value set to the index counter i, for example if a counter of 0 indicates the right front wheel, the increase/decrease pressure signal S0 input from the increase/decrease pressure signal setting means 33 for the right front wheel, is checked to determine whether it was set to increase, decrease, or hold the wheel cylinder pressure. If set to increase, flow advances to step S33.

In step S33, the pressure increase $\Delta Pa0$ of the right front wheel during the previous control cycle is calculated using equation (3). In step S34, the pressure increase $\Delta Pa0$ calculated in step S33 is added to the estimated pressure $(Pest0)_{n-1}$ of the right front wheel calculated during the previous control cycle to calculate the estimated pressure $(Pest0)_n$ of the right front wheel in the current control cycle. The estimated pressure $(Pest0)_n$ is then output to the increase/decrease pressure signal setting means 33, and flow advances to step S39.

If in step S32 the increase/decrease pressure signal S0 input from the increase/decrease pressure signal setting means 33 for the right front wheel during the previous control cycle was set to decrease the wheel cylinder pressure, flow advances to step S35. In step S35, the pressure decrease $\Delta Pd0$ of the right front wheel during the previous control cycle is calculated using equation (4). In step S36, the calculated pressure decrease $\Delta Pdi$ is added to the total pressure decrease $(\Delta Pti)_{n-1}$ during the previous control cycle to calculate the total pressure decrease $(\Delta Pti)_n$ in the current control cycle.

Next, in step S37, the pressure decrease $\Delta Pd0$ calculated in step S35 is added to the estimated pressure $(Pest0)_{n-1}$ of the right front wheel calculated during the previous control cycle to calculate the estimated pressure $(Pest0)_n$ of the right front wheel in the current control cycle. The estimated pressure $(Pest0)_n$ is then output to the increase/decrease pressure signal setting means 33, and then flow advances to step S39.

Furthermore, if in step S32 the increase/decrease pressure signal S0 input from the increase/decrease pressure signal setting means 33 for the right front wheel during the previous control cycle was set to hold the wheel cylinder pressure, flow advances to step S38. In step S38, the estimated pressure $(Pest0)_{n-1}$ of the right front wheel calculated during the previous control cycle is output to the increase/decrease pressure signal setting means 33 as the estimated pressure $(Pest0)_n$ of the right front wheel in the current control cycle, and flow advances to step S39.

In step S39, the index counter i is incremented. In step S40, it is determined whether the value of the index counter i is 4. If the value of the index counter i is not 4 (NO), flow returns to step S32, and the process from step S32 to step S38 is repeated for the wheel corresponding to an index counter i value of 1.

If in step S40 the value of the index counter i is 4 (YES), the process from step S32 to step S38 has been completed for all four wheels, the routine shown in FIG. 6 terminates, and flow advances to step S5 in FIG. 4.

Returning to step S5 in FIG. 4, the increase/decrease pressure signal setting means 33 sets an increase/decrease pressure signal Si comprising pressure-decreasing time Tdumpi, pressure-increasing time Tapplyi, and pressure-hold time Tholdi according to the control request REQi from the base control amount calculator 31, and outputs to the estimated fluid pressure calculator 32 and solenoid command output means 34.

An example of the process whereby the increase/decrease pressure signal setting means 33 sets increase/decrease pressure signal Si in step S5 is described next below with reference to the flow chart in FIG. 7. It should be noted that unless otherwise stated, all steps in the process shown in FIG. 7 are performed by the increase/decrease pressure signal setting means 33.

Figure 7:
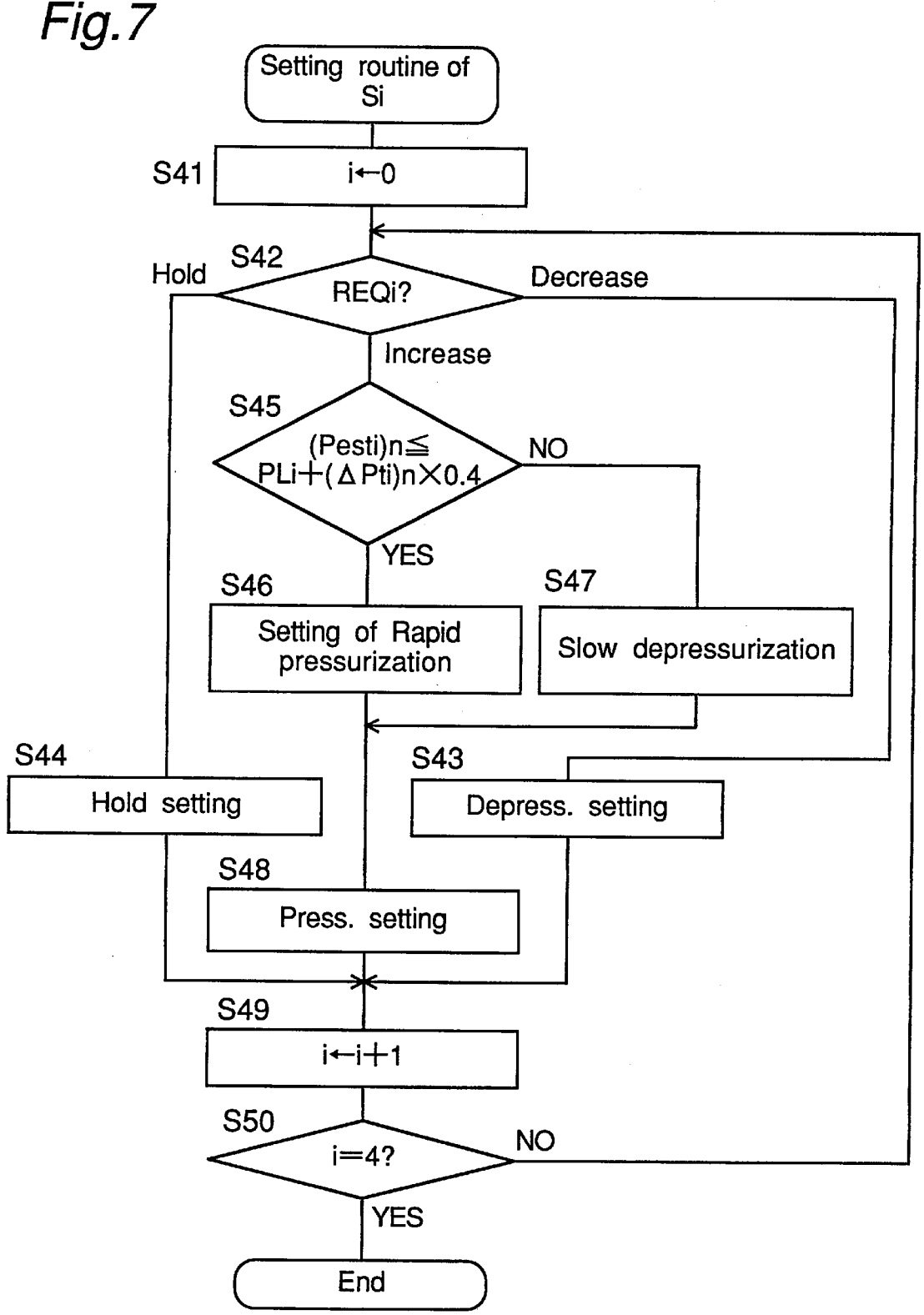
FIG. 7 is a flow chart used to describe an example of the process whereby the increase/decrease pressure signal setting means 33 in FIG. 3 sets the increase/decrease pressure signal Si.

Referring to FIG. 7, the index set for each wheel is first counted in step S41, the index counter i used for determining whether the process has been completed for all four wheels is set to 0, and the flow advances to step S42.

In step S42, the control request REQi from the base control amount calculator 31 for the tire corresponding to the counter value set to the index counter i, for example if a counter of 0 indicates the right front wheel, the control request REQ0 from the base control amount calculator 31 for the right front wheel, is checked. If the control request REQ0 is "decrease pressure," flow advances to step S43. In step S43 the increase/decrease pressure signal S0 is set to decrease the wheel cylinder pressure of the right front wheel using a known method as described above, output to the solenoid command output means 34, and flow then advances to step S49.

If in step S42 the control request REQ0 is "hold," flow advances to step S44, the increase/decrease pressure signal S0 is set to hold the wheel cylinder pressure of the right front wheel using a known method as described above, output to the solenoid command output means 34, and flow then advances to step S49.

Furthermore, if in step S42 the control request REQ0 is "increase pressure," flow advances to step S45. In step S45, it is determined whether the estimated pressure $(Pest0)_n$ of the right front wheel in the current control cycle is less than or equal to $PL0+(\Delta Pt0)_n \times 0.4$. If $(Pest0)_n \leq PL0+(\Delta Pt0)_n \times 0.4$ (YES), a rapid increase in pressure is set in step S46, and flow advances to step S48. The coefficient 0.4 here can be variably set as desired according to the friction coefficient $\mu$ of the road surface, the estimated pressure, the amount of fluid in the reservoir, and other variables, and can be variably set as desired according to the vehicle characteristics.

If in step S45 the $(Pest0)_n$ is not less than or equal to $(PL0+(\Delta Pt0)_n \times 0.4)$ (NO), a gradual increase in pressure is set in step S47, and flow advances to step S48. In step S48, the increase/decrease pressure signal S0 is set to increase the wheel cylinder pressure of the right front wheel according to the rapid pressure increase or gradual pressure increase setting using a known method as described above, the increase/decrease pressure signal S0 is output to the solenoid command output means 34, and flow advances to step S49.

In step S49, the index counter i is incremented. In step S50, it is determined whether the value of the index counter i is 4. If the value of the index counter i is not 4 (NO), flow returns to step S42, and the process from step S42 to step S48 is repeated for the wheel corresponding to an index counter i value of 1.

If in step S50 the value of the index counter i is 4 (YES), the process from step S42 to step S48 has been completed for all four wheels, the routine shown in FIG. 7 terminates, and flow advances to step S6 in FIG. 4.

Returning to step S6 in FIG. 4, the solenoid command output means 34 outputs the increase/decrease pressure signal Si input from the increase/decrease pressure signal setting means 33 to the actuator ACT0 to ACT3 of the corresponding wheel, and the routine shown in FIG. 4 terminates.

As thus described, an anti-skid control apparatus according to a first embodiment of the present invention disposes a flow control valve 3 between the master cylinder 1 and the inlet valves 4A to 4D, which are on/off solenoid valves. As a result, a particular pressure increase in the wheel cylinder pressure can be achieved independently of the pressure applied by the driver to the brake pedal, that is, without depending upon the master cylinder fluid pressure, at a low cost without using a sensor for detecting the master cylinder pressure. Furthermore, the brake fluid flow into the reservoir 8 can be consistently suppressed to a minimum level because a stable skid cycle can be achieved, and the time that anti-skid control can be continued can therefore be maximized without being affected by the master cylinder pressure.

Embodiment 2

Figure 8:
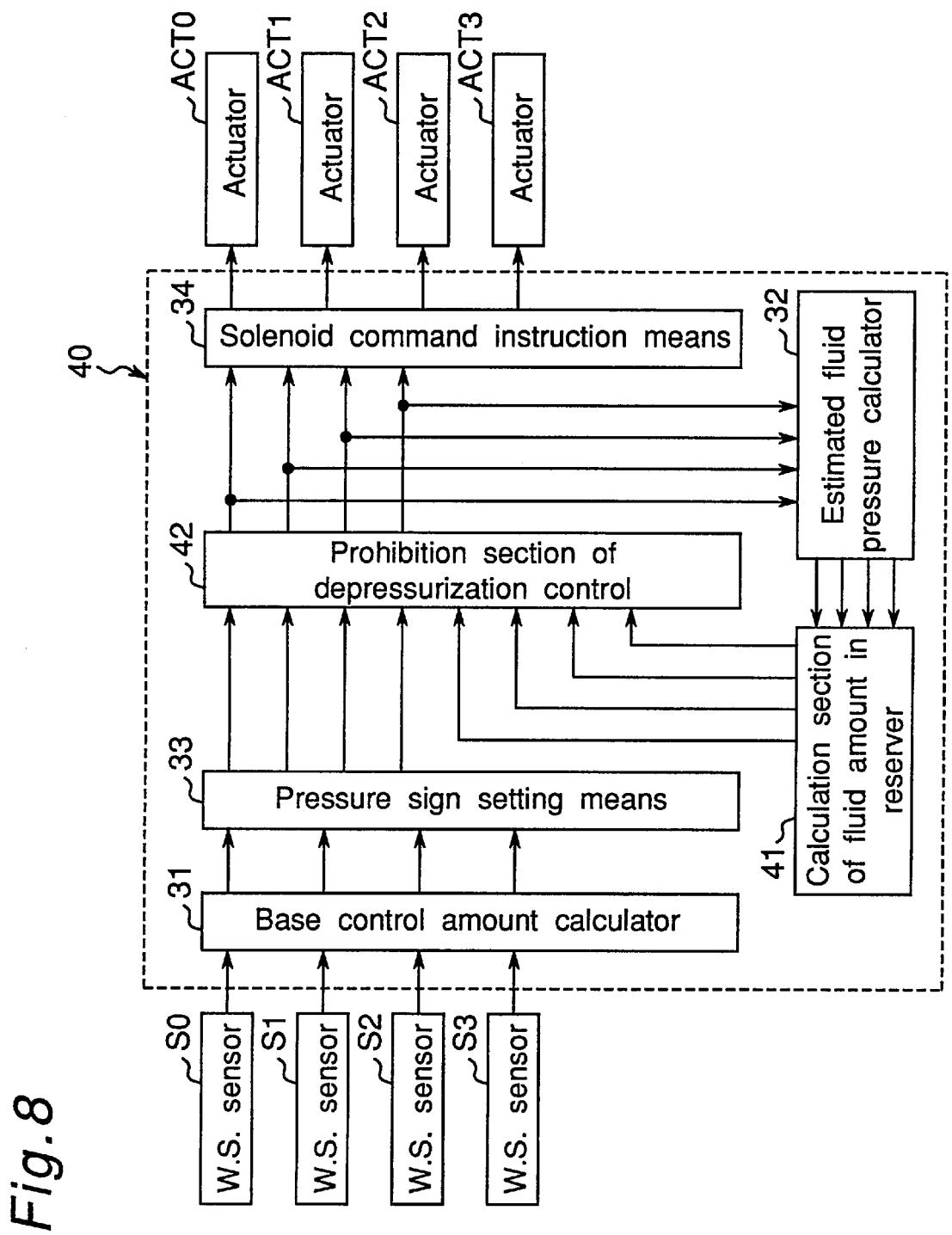
FIG. 8 is a simplified block diagram showing an example of an anti-skid control apparatus according to a second embodiment of the present invention.

FIG. 8 is a simplified block diagram exemplary of an anti-skid control apparatus according to a second embodiment of the present invention. A summary of an anti-skid control apparatus according to the second embodiment of the present invention is described first below using FIG. 8. It should be noted that a simplified control system diagram showing an anti-skid control apparatus according to the second embodiment of the present invention is identical to FIG. 1 with the exception that the signal processor 10 is labelled signal processor 40. In addition, like parts in FIG. 3 and FIG. 8 are identified by like reference numerals, and further description thereof is thus omitted below.

Comprising as shown in FIG. 8 a base control amount calculator 31, an estimated fluid pressure calculator 32, an increase/decrease pressure signal setting means 33, a reservoir fluid level calculator 41, a pressure-decreasing prohibition means 42, and a solenoid command output means 34, the signal processor 40 applies a specific process to a wheel speed signal to output an increase/decrease pressure signal Si to an actuator ACT0, ACT1, ACT2, or ACT3, each comprising an inlet valve 4A to 4D and outlet valve 5A to 5D. It should be noted that the index i is a value of 0, 1, 2, or 3, and together with indices 0, 1, 2, and 3 of a symbol indicative of a wheel speed sensor or actuator indicates the right and left front wheels and right and left rear wheels of a vehicle.

The wheel speed sensors S0 to S3 are each connected to the base control amount calculator 31, and the base control amount calculator 31 is connected to the increase/decrease pressure signal setting means 33. In addition, the increase/decrease pressure signal setting means 33 is connected to the pressure-decreasing prohibition means 42. The pressure-decreasing prohibition means 42 is connected to the solenoid command output means 34, and the junctions therebetween are connected to the estimated fluid pressure calculator 32. The estimated fluid pressure calculator 32 is also connected to the reservoir fluid level calculator 41, and the reservoir fluid level calculator 41 is connected to the pressure-decreasing prohibition means 42. The solenoid command output means 34 is connected to each of the actuators ACT0 to ACT3.

Thus comprised, the increase/decrease pressure signal setting means 33 outputs a increase/decrease pressure signal Si set as described in the first embodiment above to the pressure-decreasing prohibition means 42.

The pressure-decreasing prohibition means 42 processes the increase/decrease pressure signal Si input from the increase/decrease pressure signal setting means 33 as described below, and then outputs to the solenoid command output means 34.

When the increase/decrease pressure signal Si output from the pressure-decreasing prohibition means 42 to the solenoid command output means 34 was set for increasing the wheel cylinder pressure in the previous control cycle, the estimated fluid pressure calculator 32 calculates the pressure increase $\Delta Pai$ in the previous control cycle from equation (3) above. In addition, the estimated fluid pressure calculator 32 adds the calculated pressure increase $\Delta Pai$ to the estimated pressure $(Pesti)_{n-1}$ calculated in the previous control cycle to calculate the estimated pressure $(Pesti)_n$ in the current control cycle, and outputs to the reservoir fluid level calculator 41.

Furthermore, when the increase/decrease pressure signal Si output from the pressure-decreasing prohibition means 42 to the solenoid command output means 34 was set for decreasing the wheel cylinder pressure during the previous control cycle, the estimated fluid pressure calculator 32 calculates the pressure decrease $\Delta Pdi$ during the previous control cycle from equation (4) above, and calculates the total pressure decrease $(\Delta Pti)_n$ as described above. The estimated fluid pressure calculator 32 also calculates the estimated pressure $(Pesti)_n$ in the current control cycle by adding the calculated pressure decrease $\Delta Pdi$ to the estimated pressure $(Pesti)_{n-1}$ calculated in the previous control cycle, and sends the estimated pressure $(Pesti)_n$ to the reservoir fluid level calculator 41.

Furthermore, when the increase/decrease pressure signal Si output from the pressure-decreasing prohibition means 42 to the solenoid command output means 34 was set for maintaining the wheel cylinder pressure during the previous control cycle, the estimated fluid pressure calculator 32 sends the estimated pressure $(Pesti)_{n-1}$ calculated in the previous control cycle to the reservoir fluid level calculator 41 as the estimated pressure $(Pesti)_n$ of the current control cycle.

Next, the reservoir fluid level calculator 41 calculates the total Qtotali amount of fluid Qi flowing into the reservoir 8 from each of the wheel cylinders. The fluid amount Qi can be calculated from the following equation (6) for a pressure decrease $\Delta Pdi$ (<0) in the wheel cylinder pressure during the previous control cycle calculated by the estimated fluid pressure calculator 32.

$$Qi = M \times \Delta Pdi \qquad (6)$$

where M is a constant of unit cc/bar.

Note that M here is set respectively for the front wheels and the rear wheels according to the value of the estimated pressure $(Pesti)_n$ in the current control cycle calculated by the estimated fluid pressure calculator 32. For example, when $(Pesti)_n$ is less than or equal to 10 bar, and fluid amount Qi from a front wheel cylinder is calculated, M is set to −0.05 cc/bar; when fluid amount Qi from a rear wheel cylinder is calculated, M is set to −0.04 cc/bar.

Furthermore, when $(Pesti)_n$ is less than or equal to 40 bar, and fluid amount Qi from a front wheel cylinder is calculated, M is set to −0.017 cc/bar; when fluid amount Qi from a rear wheel cylinder is calculated, M is set to −0.03 cc/bar.

In addition, when $(Pesti)_n$ is greater than 40, and fluid amount Qi from a front wheel cylinder is calculated, M is set to −0.014 cc/bar; when fluid amount Qi from a rear wheel cylinder is calculated, M is set to −0.03 cc/bar.

The reservoir fluid level calculator 41 thus calculates the total Qtotali amount of fluid Qi flowing into the reservoir 8 from each of the wheel cylinders, calculates the total QtotalFR for the FR circuit by adding each total Qtotali in the brake circuit comprising the right front wheel and left rear wheel, referred to below as the FR circuit, calculates the total QtotalFL for the FL circuit by adding each total Qtotali in the brake circuit comprising the left front wheel and right rear wheel, referred to below as the FL circuit, and outputs to the pressure-decreasing prohibition means 42.

A brake switch (not shown in the figures) for detecting that the brake pedal has been depressed by the driver is normally provided, and the reservoir fluid level calculator 41 comprises a timer TM (not shown in the figures) for measuring by means of this brake switch the time that the brake pedal is not depressed by the driver. Brake fluid in the reservoir 8 returns through the check valve 6 to the master cylinder 1 from the time the driver releases the brake pedal. If the driver releases the brake pedal and this condition continues for longer than a period that can be considered long enough for all brake fluid in the reservoir 8 to have returned to the master cylinder 1, for example, for one second or longer, that is, if the count TC of the timer TM reaches or passes 125, which is equivalent to one second, the reservoir fluid level calculator 41 sets the calculated total Qtotali to 0, sets the total QtotalFR for the FR circuit and the total QtotalFL for the FL circuit to 0, and outputs to the pressure-decreasing prohibition means 42.

Next, the pressure-decreasing prohibition means 42 determines whether to prohibit pressure-decreasing control of the wheel cylinder pressure by means of the increase/decrease pressure signal Si set by the increase/decrease pressure signal setting means 33 according to the total QtotalFR and total QtotalFL calculated by the reservoir fluid level calculator 41. For example, if the total QtotalFR exceeds a specific threshold value Qthr, it is determined to prohibit decreasing the wheel cylinder pressure of the right front wheel and the left rear wheel; if the increase/decrease pressure signal Si for the right front wheel and left rear wheel input from the increase/decrease pressure signal setting means 33 is set for decreasing the wheel cylinder pressure, the respective increase/decrease pressure signals Si are changed to a setting for holding the wheel cylinder pressure, and output to the solenoid command output means 34. It is likewise determined to prohibit decreasing the pressure of the left front wheel and right rear wheel if the total QtotalFL exceeds threshold value Qthr.

Furthermore, when the increase/decrease pressure signal Si input from the increase/decrease pressure signal setting means 33 is not set for decreasing the wheel cylinder pressure, the pressure-decreasing prohibition means 42 outputs the increase/decrease pressure signal Si supplied from the increase/decrease pressure signal setting means 33 directly to the solenoid command output means 34. When the total QtotalFR and total QtotalFL do not exceed the threshold value Qthr, the pressure-decreasing prohibition means 42 outputs the increase/decrease pressure signal Si input for each circuit from the increase/decrease pressure signal setting means 33 directly to the solenoid command output means 34.

It should be noted here that the threshold value Qthr is determined from the margin in the stroke of the brake pedal. If the current vehicle deceleration G is G0, the friction coefficient $\mu$ of the road surface being travelled changes to a high friction coefficient $\mu$, and the vehicle deceleration G0 is to be recovered to a minimum vehicle deceleration Gtarget, the threshold value Qthr is determined from the margin in the stroke of the brake pedal whereby the brake fluid amount ΔQ required to increase the wheel cylinder pressure from P0 to Ptarget can be transferred where P0 is the wheel cylinder pressure equivalent to vehicle deceleration G0, and Ptarget is the wheel cylinder pressure equivalent to the minimum vehicle deceleration Gtarget. For example, the above minimum vehicle deceleration Gtarget is 0.8 g.

Based on the increase/decrease pressure signal Si input by way of the pressure-decreasing prohibition means 42, the solenoid command output means 34 controls the operation of the inlet valves 4A to 4D and outlet valves 5A to 5D of the actuators ACT0 to ACT3.

Figure 9:
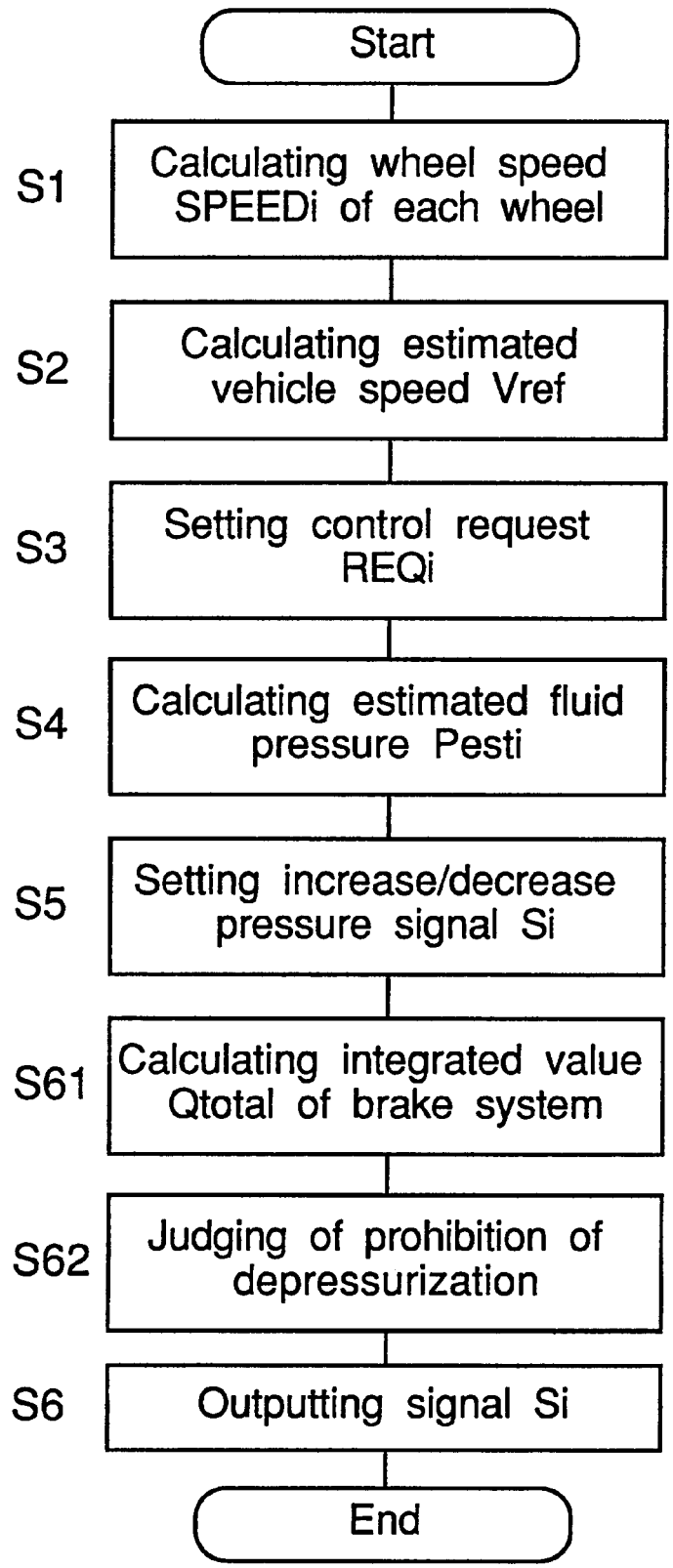
FIG. 9 is a simplified flow chart used to describe an example of the operation of the anti-skid control apparatus shown in FIG. 8.

The operation of an anti-skid control apparatus shown in FIG. 8 is described next with reference to FIG. 9 to FIG. 11. FIG. 9 is a simplified flow chart of an example of the operation of the anti-skid control apparatus shown in FIG. 8. It should be noted that identical steps in FIG. 4 and FIG. 9 are identified by the same reference numeral, and further description thereof is omitted below where only the differences from FIG. 4 are described.

The difference between FIG. 9 and FIG. 4 is that step S61 and step S62 have been inserted in FIG. 9 between step S5 and step S6 in FIG. 4.

Referring to FIG. 9, in step S61 after the process of step S5, the reservoir fluid level calculator 41 calculates the fluid amount Qi flowing into the reservoir 8 from the wheel cylinders based on the pressure decrease ΔPdi in the previous control cycle calculated by the estimated fluid pressure calculator 32, and the constant M set according to the value of the estimated pressure (Pesti)$_n$ of each wheel in the current control cycle, using equation (6), and also calculates the total Qtotali of the fluid amount Qi. The reservoir fluid level calculator 41 also calculates the total QtotalFR of the FR circuit, and the total QtotalFL of the FL circuit, from the total Qtotali, and outputs to the pressure-decreasing prohibition means 42.

An exemplary process whereby the total Qtotali is calculated by the reservoir fluid level calculator 41 in step S61 is described next below with reference to the flow chart in FIG. 10. Note that unless otherwise specified, all steps in the process in FIG. 10 are performed by the reservoir fluid level calculator 41.

Figure 10:
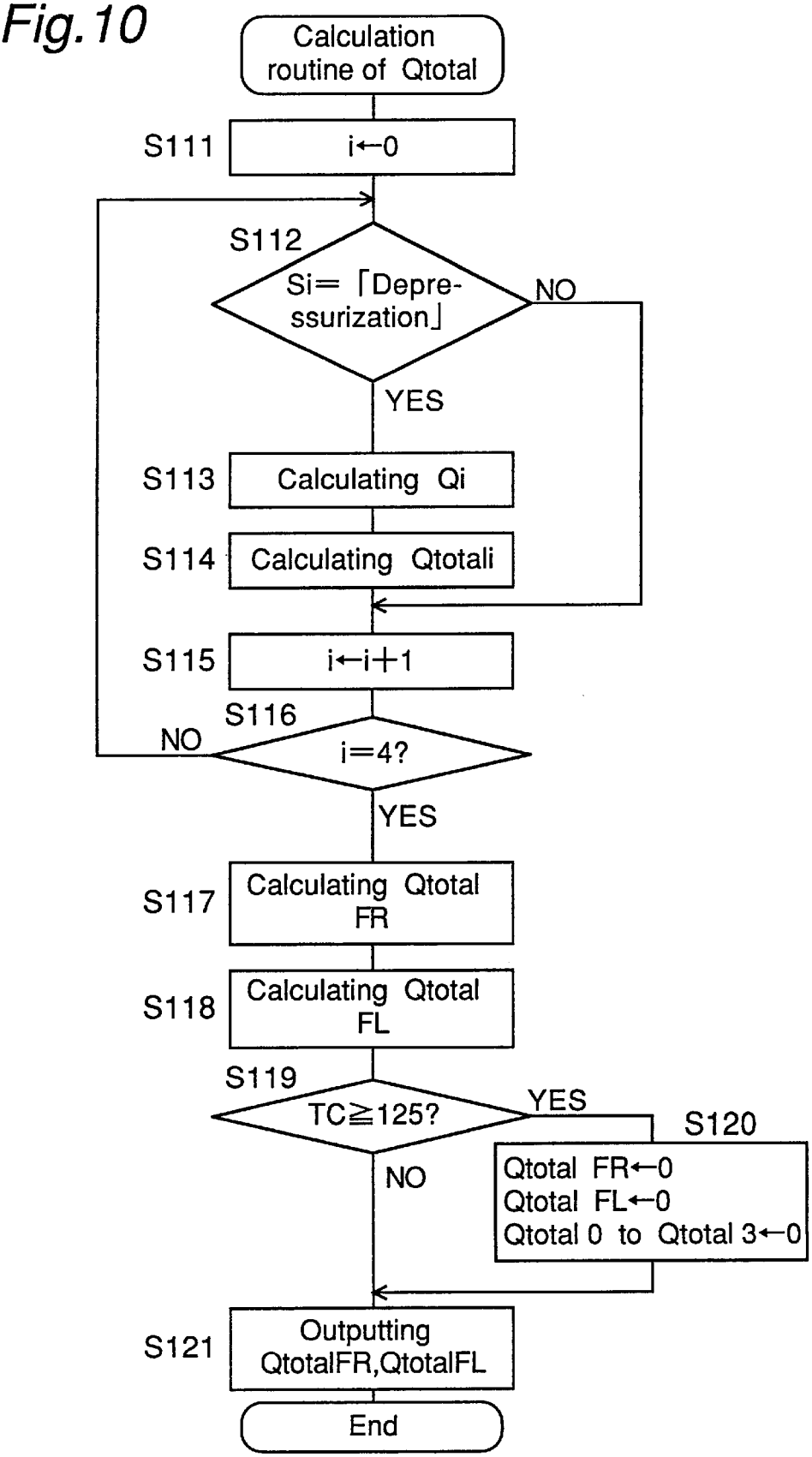
FIG. 10 is a flow chart used to describe an example of the process whereby the reservoir fluid level calculator 41 in FIG. 8 calculates the total Qtotal.

At the first step S111 in FIG. 10, the index set for each wheel is counted, the index counter i used for determining whether the process has been completed for all four wheels is set to 0, and the flow advances to step S112.

At step S112, the increase/decrease pressure signal Si input from the increase/decrease pressure signal setting means 33 for the wheel corresponding to the value set to the index counter i, for example, if a counter of 0 indicates the right front wheel, the increase/decrease pressure signal S0 corresponding to the right front wheel, is checked to determine whether it is set for decreasing wheel cylinder pressure. If it is set for decreasing pressure (YES), flow advances to step S113; if not (NO), flow advances to step S115.

In step S113, the fluid amount Q0 flowing into the reservoir 8 from the wheel cylinder of the right front wheel is calculated using equation (6). In step S114, the fluid amount Q0 calculated in step S113 is added to the total (Qtotal0)$_{n-1}$ calculated in the previous control cycle to calculate the total (Qtotal0)$_n$ in the current control cycle, and flow advances to step S115.

In step S115, the index counter i is incremented. In step S116, it is determined whether the value of the index counter i is 4. If the value of the index counter i is not 4 (NO), flow returns to step S112, and the process from step S112 to step S114 is repeated for the wheel corresponding to an index counter i value of 1. If in step S116 the value of the index counter i is 4 (YES), flow advances to step S117.

In step S117, the total (Qtotal0)$_n$ for the right front wheel and the total (Qtotal3)$_n$ for the left rear wheel in the current control cycle are added to calculate the total QtotalFR for the FR circuit. In step S118, the total (Qtotal1)$_n$ for the left front wheel and the total (Qtotal2)$_n$ for the right rear wheel in the current control cycle are added to calculate the total QtotalFL for the FL circuit, and flow advances to step S119.

In step S119, it is determined whether the time measured by the timer TM exceeds 1 second, that is, whether the count TC of the timer TM exceeds 125. If TC exceeds 125 (YES), flow advances to step S120.

In step S120, the total QtotalFR for the FR circuit and the total QtotalFL for the FL circuit are both set to 0 together with Qtotali (i=0 to 3), and flow advances to step S121.

If in step S119 TC is less than 125 (NO), flow advances to step S121. In step S121, the total QtotalFR for the FR circuit and the total QtotalFL for the FL circuit are output to the pressure-decreasing prohibition means 42. The routine shown in FIG. 10 terminates, and flow advances to step S62 in FIG. 9.

Next, returning to step S62 in FIG. 9, if either the total QtotalFR for the FR circuit or the total QtotalFL for the FL circuit calculated by the reservoir fluid level calculator 41 exceeds a threshold value Qthr, the pressure-decreasing prohibition means 42 determines to prohibit pressure-decreasing control for the wheel cylinder pressure based on the increase/decrease pressure signal Si input from the increase/decrease pressure signal setting means 33. If the increase/decrease pressure signal Si input from the increase/decrease pressure signal setting means 33 is set for decreasing the wheel cylinder pressure, the pressure-decreasing prohibition means 42 changes the increase/decrease pressure signal Si to hold the wheel cylinder pressure, and outputs to the solenoid command output means 34.

An exemplary process whereby the pressure-decreasing prohibition means 42 prohibits pressure-decreasing control of the wheel cylinder pressure shown in step S62 is described next below with reference to the flow chart in FIG. 11. Note that unless otherwise specified, all steps in the process in FIG. 11 are performed by the pressure-decreasing prohibition means 42.

Figure 11:
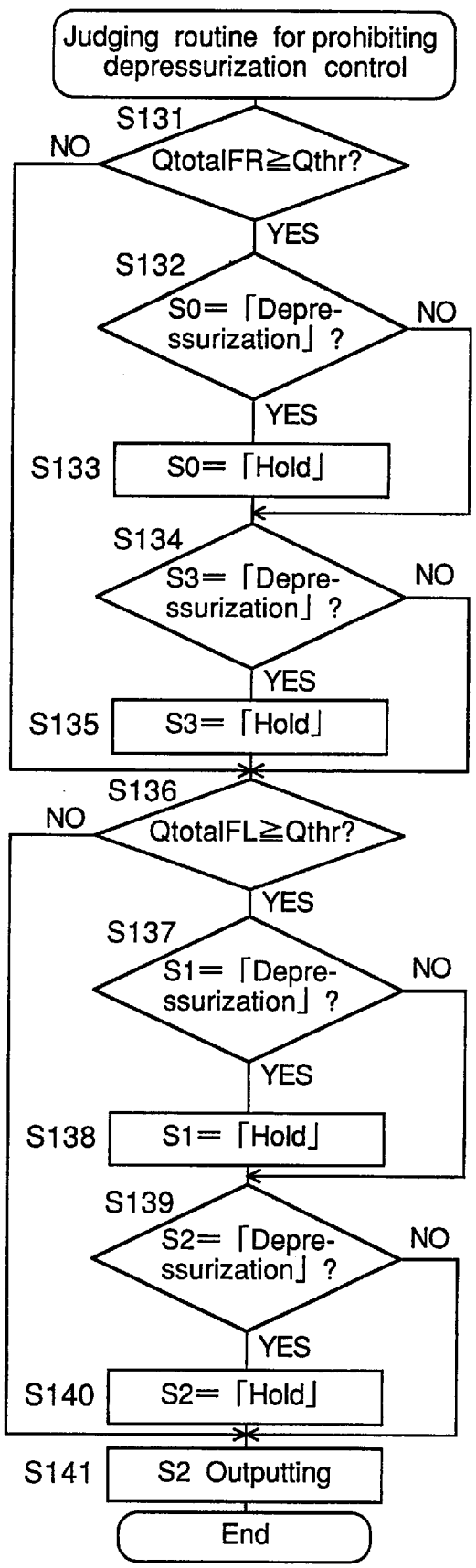
FIG. 11 is a flow chart used to describe an example of the process whereby the pressure-decreasing prohibition means 42 in FIG. 8 prohibits pressure-decreasing control.

First, in step S131 in FIG. 11, it is determined whether the total QtotalFR for the FR circuit calculated by the reservoir fluid level calculator 41 exceeds the threshold value Qthr. If the total QtotalFR exceeds the threshold value Qthr (YES), flow advances to step S132; if total QtotalFR does not exceed threshold value Qthr (NO), flow advances to step S136.

In step S132, it is determined whether the increase/decrease pressure signal S0 for the right front wheel is set for decreasing the wheel cylinder pressure. If it is (YES), flow advances to step S133; if not (NO), flow advances to step S134.

In step S133, the increase/decrease pressure signal S0 input from the increase/decrease pressure signal setting means 33 is changed to a setting for holding the wheel cylinder pressure, and flow advances to step S134.

In step S134, it is determined whether the increase/decrease pressure signal S3 for the left rear wheel is set for decreasing the wheel cylinder pressure. If it is (YES), flow advances to step S135; if not (NO), flow advances to step S136.

In step S135, the increase/decrease pressure signal S3 input from the increase/decrease pressure signal setting means 33 is changed to a setting for holding the wheel cylinder pressure, and flow advances to step S136.

In step S136, it is determined whether the total QtotalFL for the FL circuit calculated by the reservoir fluid level calculator 41 exceeds the threshold value Qthr. If the total QtotalFL exceeds the threshold value Qthr (YES), flow advances to step S137; if total QtotalFL does not exceed threshold value Qthr (NO), flow advances to step S141.

In step S137, it is determined whether the increase/decrease pressure signal S1 for the left front wheel is set for decreasing the wheel cylinder pressure. If it is (YES), flow advances to step S138; if not (NO), flow advances to step S139.

In step S138, the increase/decrease pressure signal S1 input from the increase/decrease pressure signal setting means 33 is changed to a setting for holding the wheel cylinder pressure, and flow advances to step S139.

In step S139, it is determined whether the increase/decrease pressure signal S2 for the right rear wheel is set for decreasing the wheel cylinder pressure. If it is (YES), flow advances to step S140; if not (NO), flow advances to step S141.

In step S140, the increase/decrease pressure signal S2 input from the increase/decrease pressure signal setting means 33 is changed to a setting for holding the wheel cylinder pressure, and flow advances to step S141.

In step S141, the increase/decrease pressure signal Si is output to the solenoid command output means 34, the routine shown in FIG. 11 terminates, and flow advances to step S6 in FIG. 9.

Returning to step S6 in FIG. 9, the solenoid command output means 34 outputs the increase/decrease pressure signal Si input from the pressure-decreasing prohibition means 42 to the actuator ACT0 to ACT3 of the corresponding wheel, and the routine shown in FIG. 9 terminates.

As thus described, an anti-skid control apparatus according to a second embodiment of the present invention disposes a flow control valve 3 between the master cylinder 1 and the inlet valves 4A to 4D, which are on/off solenoid valves. As a result, the same effects as achieved by the first embodiment can be realized.

In addition, the brake fluid accumulated in the reservoir 8 is estimated and a tolerance for brake pedal depression is estimated. It is therefore possible to prohibit pressure-decreasing control of the wheel cylinder pressure before the brake pedal depression tolerance disappears in response to the problem of the brake pedal depression tolerance becoming small and the ability to recover vehicle deceleration becoming lost when the road surface friction coefficient $\mu$ changes suddenly from a high friction coefficient $\mu$ to a low friction coefficient $\mu$, a large volume of brake fluid flows into the reservoir 8, and the road surface friction coefficient $\mu$ changes again to a high friction coefficient $\mu$. As a result, sufficient vehicle deceleration can be achieved even after the road surface changes to a high friction coefficient $\mu$ surface, and safety can be assured.

Figure 12:
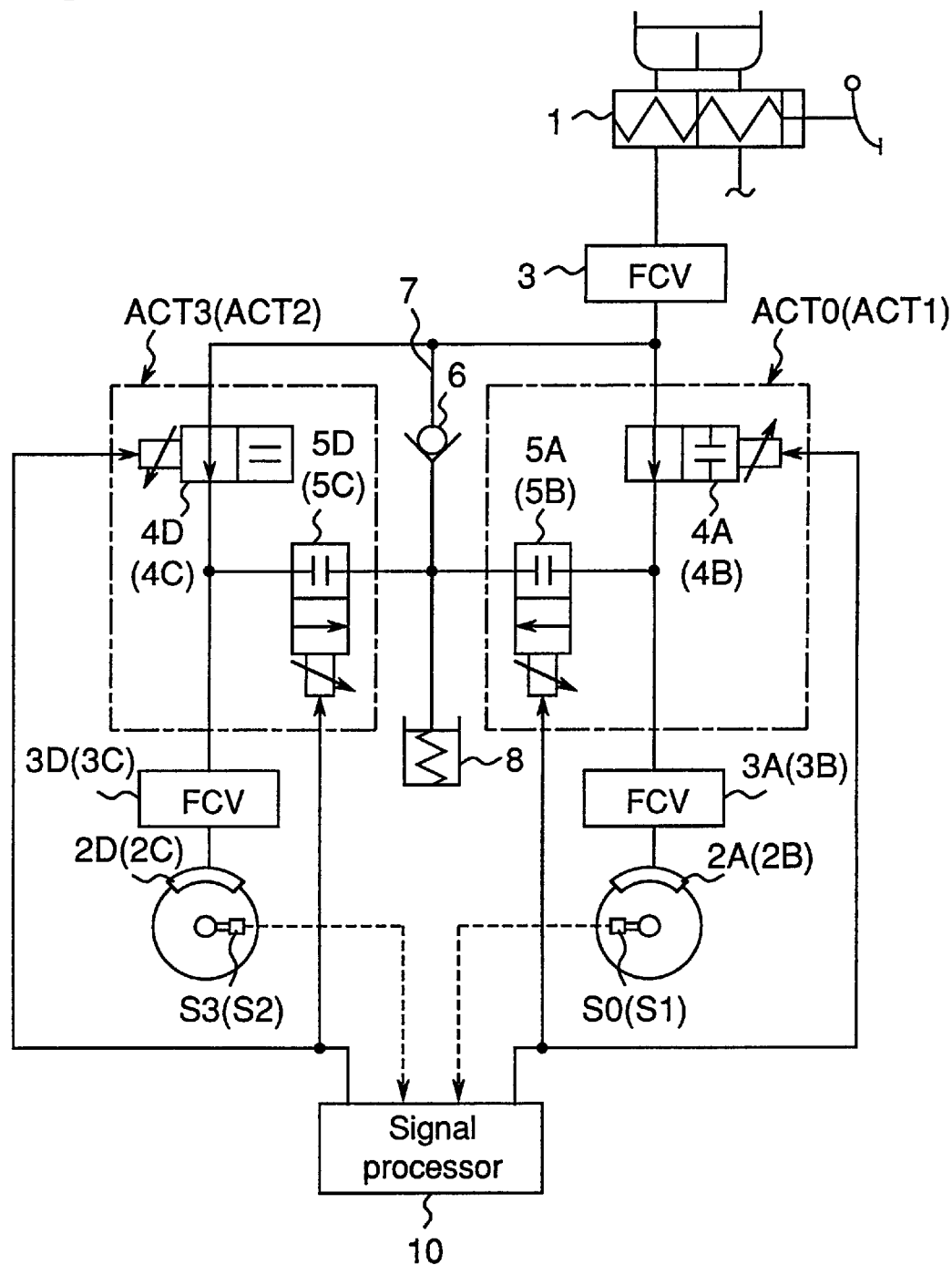
FIG. 12 is a simplified control system diagram showing an alternative example of an anti-skid control apparatus in a first and second embodiment of the present invention.

It should be noted that while in the first and second embodiments above the flow control valve 3 is disposed between the master cylinder 1 and the actuators ACT0 to ACT3. However, as shown in FIG. 12, a flow control valve 3A to 3D can be disposed respectively between each actuator ACT0 to ACT3 and each wheel cylinder 2A to 2D. This case is the same except that it is not necessary to separately set the constant k, which is set for calculating the pressure increase $\Delta$Pai of the wheel cylinder pressure by means of the estimated fluid pressure calculator 32 in the first and second embodiments, when the pressure of both wheels on the same brake circuit is increased, and a method of setting constant k when the pressure of only one of the wheels on the same brake circuit rises is sufficient.

Effects of the invention;

As will be known from the preceding description, an anti-skid control apparatus according to the present invention disposes a flow control valve between the master cylinder and wheel cylinder in an anti-skid control apparatus comprising a pumpless fluid pressure control device, or more specifically disposes a flow control valve between the master cylinder and fluid pressure control device, or between the fluid pressure control device and the wheel cylinder of each wheel. As a result, a desired increase in the wheel cylinder pressure can be achieved without depending on the force of brake pedal depression by the driver, that is, without depending on the master cylinder fluid pressure, at low cost without separately providing a sensor for detecting the master cylinder fluid pressure. Furthermore, the brake fluid flow into the reservoir can be consistently suppressed to a minimum level because a stable skid cycle can be achieved, and the time that anti-skid control can be continued can therefore be maximized without being affected by the master cylinder pressure. Moreover, the precision of calculating the estimated wheel cylinder pressure is increased by using a flow control valve, thus enabling more precise control, and thereby enabling control maximizing the time that anti-skid control can be continued.

In addition, in an anti-skid control apparatus according to the present invention, the signal processor, that is more specifically the pressure-decreasing prohibition means constituting part of the signal processor, prohibits decreasing the wheel cylinder pressure when the accumulated fluid level in the reservoir calculated by a reservoir fluid level calculator exceeds a prescribed level. It is therefore possible to prohibit decreasing the wheel cylinder pressure before the brake pedal depression tolerance disappears in response to the problem of the brake pedal depression tolerance becoming small and the ability to recover vehicle deceleration becoming lost when the road surface friction coefficient $\mu$ changes suddenly from a high friction coefficient $\mu$ to a low friction coefficient $\mu$, a large volume of brake fluid flows into the reservoir 8, and the road surface friction coefficient $\mu$ changes again to a high friction coefficient $\mu$ As a result, sufficient vehicle deceleration can be achieved even after the road surface changes to a high friction coefficient $\mu$ surface, and safety can be assured.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An anti-skid control apparatus comprising;
   a fluid pressure control valve for controlling the wheel cylinder pressure;
   a reservoir for temporarily storing brake fluid expelled from a wheel cylinder during anti-skid control, said reservoir being arranged between a master cylinder and wheel cylinder of each wheel;
   a pumpless fluid pressure control device for circulating brake fluid stored in said reservoir back to a master cylinder; and
   a flow control valve to maintain a constant flow of brake fluid between said master cylinder and wheel cylinder.

2. The anti-skid control apparatus according to claim 1, wherein the flow control valve is disposed between the master cylinder and fluid pressure control device.

3. The anti-skid control apparatus according to claim 1, wherein the flow control valve is disposed between the fluid pressure control device and a wheel cylinder of each wheel.

4. The anti-skid control apparatus according to claim 1, further comprising
   a wheel speed sensor provided to each wheel for detecting a wheel speed, and
   a signal processing device for performing anti-skid control by detecting a condition of each wheel based upon a signal from each wheel speed sensor, and controlling the fluid pressure control device according to the condition of each wheel,
   wherein the signal processing device comprises a pressure-decreasing prohibition device for calculating an estimated pressure for each wheel cylinder based on a wheel cylinder pressure control command set according to respective signals from each wheel speed sensor, and prohibiting pressure-decreasing control of the wheel cylinder pressure by the fluid pressure control device when a total fluid amount accumulated in a reservoir calculated from a calculated estimated pressure exceeds a prescribed value.

5. The anti-skid control apparatus according to claim 4, wherein the signal processing device comprises
   a speed calculation means for calculating a wheel speed of each wheel and an estimated vehicle speed from respective signals of each wheel speed sensor,
   a wheel condition detection means for detecting a condition of each wheel from a wheel speed and estimated vehicle speed calculated by the speed calculation means,
   a fluid pressure control command means for instructing wheel cylinder pressure control of a corresponding wheel according to the condition of each wheel detected by a wheel condition detection means,
   an estimated fluid pressure calculation means for calculating an estimated fluid pressure in a wheel cylinder of each wheel from a command set by the fluid pressure control command means,
   a control means for controlling said fluid pressure control device based on a command from the fluid pressure control command means, and
   a reservoir fluid level calculation means for calculating the total amount of fluid accumulated in the reservoir from the estimated fluid pressure calculated by the estimated fluid pressure calculation means,
   wherein the pressure-decreasing prohibition means prohibits pressure-decreasing control of the wheel cylinder pressure by the control means when the total fluid amount calculated by the reservoir fluid level calculation means exceeds a prescribed level.

6. The anti-skid control apparatus according to claim 2, further comprising:
   a wheel speed sensor provided to each wheel for detecting a wheel speed, and
   a signal processing device for performing anti-skid control by detecting a condition of each wheel based upon a signal from each wheel speed sensor, and controlling the fluid pressure control device according to the condition of each wheel,
   wherein the signal processing device comprises a pressure-decreasing prohibition device for calculating an estimated pressure for each wheel cylinder based on a wheel cylinder pressure control command set according to respective signals from each wheel speed sensor, and prohibiting pressure-decreasing control of the wheel cylinder pressure by the fluid pressure control device when a total fluid amount accumulated in a reservoir calculated from a calculated estimated pressure exceeds a prescribed value.

7. The anti-skid control apparatus according to claim 3, further comprising:
   a wheel speed sensor provided to each wheel for detecting a wheel speed, and
   a signal processing device for performing anti-skid control by detecting a condition of each wheel based upon a signal from each wheel speed sensor, and controlling the fluid pressure control device according to the condition of each wheel,
   wherein the signal processing device comprises a pressure-decreasing prohibition device for calculating an estimated pressure for each wheel cylinder based on a wheel cylinder pressure control command set according to respective signals from each wheel speed sensor, and prohibiting pressure-decreasing control of the wheel cylinder pressure by the fluid pressure control device when a total fluid amount accumulated in a reservoir calculated from a calculated estimated pressure exceeds a prescribed value.

8. The anti-skid control apparatus according to claim 4, wherein the signal processing device comprises:
   a speed calculation device that calculates a wheel speed of each wheel and an estimated vehicle speed from respective signals of each wheel speed sensor,
   a wheel condition detection device that detects a condition of each wheel from a wheel speed and estimated vehicle speed calculated by the speed calculation device,
   a fluid pressure control command device that instructs wheel cylinder pressure control of a corresponding wheel according to the condition of each wheel detected by the wheel condition detection device,
   an estimated fluid pressure calculation device that calculates an estimated fluid pressure in a wheel cylinder of each wheel from a command set by the fluid pressure control command device,
   a control system that controls said fluid pressure control device based on a command from the fluid pressure control command device, and
   a reservoir fluid level calculation system that calculates the total amount of fluid accumulated in the reservoir from the estimated fluid pressure calculated by the estimated fluid pressure calculation device,
   wherein the pressure-decreasing prohibition device prohibits pressure-decreasing control of the wheel cylinder pressure by the control system when the total fluid amount calculated by the reservoir fluid level calculation system exceeds a prescribed level.

* * * * *